US012808486B2

(12) United States Patent
Borup et al.

(10) Patent No.: US 12,808,486 B2
(45) Date of Patent: Nov. 24, 2026

(54) SYNCHRONOUS REFUELING OF A PLURALITY OF FUEL CELL VEHICLES FROM A MOBILE REFUELING STATION

(71) Applicant: Everfuel Europe A/S, Herning (DK)

(72) Inventors: Uffe Vikøren Borup, Sydals (DK); Jacob Bech Krogsgaard, Holstebro (DK); Magnus Haugaard Rønne, Herning (DK); Janus Lindal Rathke, Viborg (DK)

(73) Assignee: EVERFUEL EUROPE A/S, Herning (DK)

( * ) Notice: Subject to any disclaimer, the term of this patent is extended or adjusted under 35 U.S.C. 154(b) by 0 days.

(21) Appl. No.: 18/835,141

(22) PCT Filed: Feb. 1, 2023

(86) PCT No.: PCT/DK2023/050022

§ 371 (c)(1),
(2) Date: Aug. 1, 2024

(87) PCT Pub. No.: WO2023/147830

PCT Pub. Date: Aug. 10, 2023

(65) Prior Publication Data

US 2025/0164075 A1 May 22, 2025

(30) Foreign Application Priority Data

Feb. 4, 2022 (DK) ................................. 202270049

(51) Int. Cl.
*F17C 5/00* (2006.01)

(52) U.S. Cl.
CPC ........ *F17C 5/007* (2013.01); *F17C 2221/012* (2013.01); *F17C 2223/0123* (2013.01);
(Continued)

(58) Field of Classification Search
CPC .............. F17C 5/007; F17C 2205/0326; F17C 2221/012; F17C 2250/032;
(Continued)

(56) References Cited

U.S. PATENT DOCUMENTS

2003/0148153 A1 8/2003 Mitlitsky et al.
2004/0163731 A1 * 8/2004 Eichelberger ............ F17C 1/00 141/284

(Continued)

FOREIGN PATENT DOCUMENTS

CN 113124312 A 7/2021
DE 112009005421 T5 12/2012

(Continued)

OTHER PUBLICATIONS

FR 3109980 A3- English Translation (Year: 2013).*

(Continued)

*Primary Examiner* — Christopher M Afful
(74) *Attorney, Agent, or Firm* — CANTOR COLBURN LLP

(57) ABSTRACT

The invention relates to a mobile hydrogen refueling station comprising at least a first, second and third hydrogen gas source configured for storing gas at different pressures. Said mobile hydrogen refueling station further comprises at least two filling hoses, connectable to said first, second and third hydrogen source a via conduit system and to a receiving vessel. Said mobile hydrogen refueling station further comprises a controller configured for simultaneously controlling refueling of at least a first and a second receiving vessel by: controlling flow of hydrogen gas from said first, second or third hydrogen gas source via a first of said at least two filling hoses to said first receiving vessel, and controlling flow of hydrogen gas from said first, second or third hydro-
(Continued)

Figure 1:
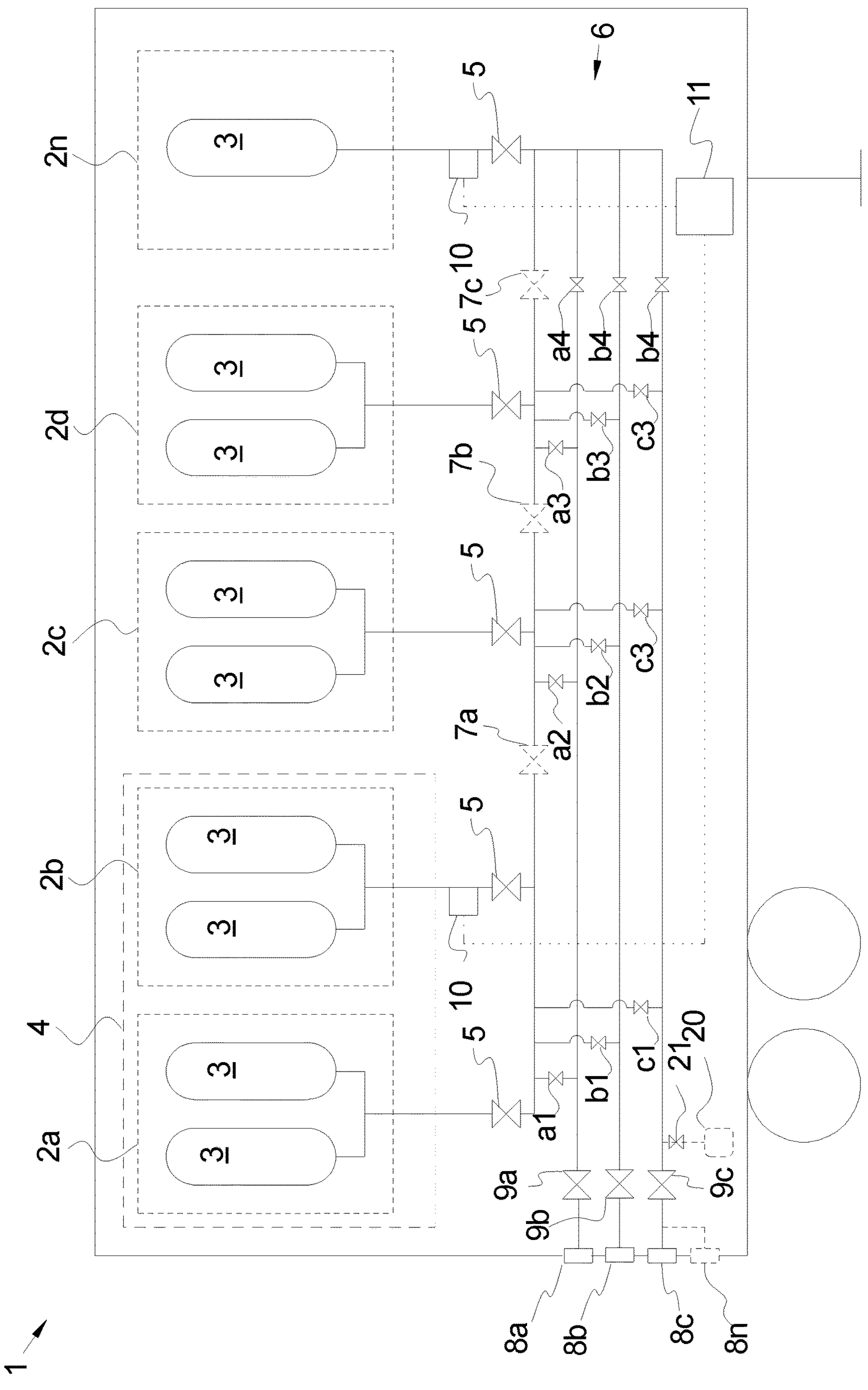

gen gas source via a second of said at least two filling hoses to said second receiving vessel.

8 Claims, 6 Drawing Sheets

(52) U.S. Cl.
CPC ............................ *F17C 2250/043* (2013.01); *F17C 2250/0439* (2013.01); *F17C 2265/065* (2013.01)

(58) Field of Classification Search
CPC ...... F17C 2250/0434; F17C 2250/0439; F17C 2250/07; F17C 2270/0184
See application file for complete search history.

(56) References Cited

U.S. PATENT DOCUMENTS

| | | | | |
|---|---|---|---|---|
| 2006/0180240 | A1 | 8/2006 | Niedzwiechi et al. | |
| 2009/0107577 | A1* | 4/2009 | Allidieres | F17C 7/00 141/47 |
| 2013/0240080 | A1 | 9/2013 | Fimian et al. | |
| 2013/0248000 | A1* | 9/2013 | Killeen | F17C 5/06 251/304 |
| 2014/0024117 | A1 | 1/2014 | Kim et al. | |
| 2014/0261864 | A1* | 9/2014 | Cohen | F17C 5/06 141/4 |
| 2016/0215796 | A1* | 7/2016 | Gouvêa | F17C 9/00 |
| 2018/0023763 | A1* | 1/2018 | Ravinel | G05D 23/2033 62/87 |
| 2018/0073679 | A1* | 3/2018 | Roberge | F17C 13/026 |
| 2019/0226638 | A1* | 7/2019 | Heydorn | F17C 13/083 |
| 2024/0240756 | A1* | 7/2024 | Hodgson | F17C 5/06 |

FOREIGN PATENT DOCUMENTS

| | | | | |
|---|---|---|---|---|
| EP | 3263969 | A1 | 1/2018 | |
| EP | 3680543 | A1 | 7/2020 | |
| EP | 3892910 | A1 | 10/2021 | |
| EP | 3985299 | A1 | 4/2022 | |
| FR | 3094454 | A1 | 10/2020 | |
| FR | 3109980 | A3 * | 11/2021 | F17C 5/06 |
| KR | 100804788 | B1 | 2/2008 | |
| WO | 2020147911 | A1 | 7/2020 | |
| WO | 2021083471 | A1 | 5/2021 | |
| WO | 2022002330 | A1 | 1/2022 | |

OTHER PUBLICATIONS

Written Opinion for corresponding application PCT/DK2023/050022 filed Feb. 1, 2023. Mail date May 17, 2023.
International Search Report for corresponding application PCT/DK2023/050022 filed Feb. 1, 2023. Mail date May 17, 2023.
European Office Action for corresponding application 23 705 479.6; Mail date Aug. 4, 2026.

* cited by examiner

SYNCHRONOUS REFUELING OF A PLURALITY OF FUEL CELL VEHICLES FROM A MOBILE REFUELING STATION

FIELD OF THE INVENTION

The present invention relates to a mobile refueling station configured for synchronous refueling of a plurality of fuel cell vehicles and a method for synchronous refueling of a plurality of fuel cell vehicles.

BACKGROUND OF THE INVENTION

Prior art document CN113124312 disclose a hydrogen refueling station based on a plurality of temporary storage devices each connected in one end to a hydrogen storage tank and in one end to a filling device. A vehicle can automatically be connected to and refueled from the filling device.

Prior art document WO2022/002330 disclose a trailer from which a fuel cell vehicle can be refueled. The trailer comprises a plurality of storage vessels facilitating storing hydrogen gas at different pressure levels.

Prior art document WO2021083471 disclose a hydrogen refueling station facilitating refueling of two fuel cell vehicles simultaneously.

SUMMARY OF THE INVENTION

A problem with the mobile prior art refueling stations is that refuelings are slow either because the mobile refueling station does not comprise compressor or because it does not comprise a cooling system for cooling hydrogen gas prior to refueling a receiving vessel. The present invention solves this problem by allowing synchronous refueling of two or more receiving vessels simultaneously from a sectionized mobile refueling storage and by controlling the flow of hydrogen gas from the sectionized mobile refueling storage to the receiving vessel based on information related to temperature of gas in the receiving vessel.

Accordingly, there is no description in that art of a mobile hydrogen refueling station solving the above problem by allowing simultaneous refueling of two or more receiving vessels according to a pulse controlled refueling method.

In an aspect the invention relates to a mobile hydrogen refueling station comprising at least a first hydrogen gas source, a second hydrogen gas source and a third hydrogen gas source, wherein said first hydrogen gas source is configured for storing hydrogen gas at a first pressure, said second hydrogen gas source is configured for storing hydrogen gas at a second pressure and said third hydrogen gas source is configured for storing hydrogen gas at a third pressure, wherein at least two of said first, second and third pressures being different. Said mobile hydrogen refueling station further comprises at least two filling hoses, wherein each of said at least two filling hoses have: a first end that is fluidly connectable to said first, second and third hydrogen source a via conduit system and a second end that is fluidly connectable to a receiving vessel. Said mobile hydrogen refueling station further comprises a controller configured for simultaneously controlling refueling of at least a first and a second receiving vessel by: controlling flow of hydrogen gas from said first, second or third hydrogen gas source via a first of said at least two filling hoses to said first receiving vessel, and controlling flow of hydrogen gas from said first, second or third hydrogen gas source via a second of said at least two filling hoses to said second receiving vessel.

This is advantageous in that it has the effect, that refueling of two receiving vessels can be made simultaneously independent of start pressure of the two receiving vessels. This leads to a higher number of refuelings possible to perform within a given time period compared to the number of refuelings possible to perform within the same time period from prior art mobile refueling stations. This is made possible without changing trailer design i.e. without a trailer having a conduit system e.g. with several manifold and the need to multiply the number of valves, transmitters and safety equipment. In fact compared to know refueling trailers, the number of valves and conduits may be reduced significantly.

The design of a mobile refueling station able to refuel a plurality of fuel cell vehicles simultaneously according to the pause refueling method of an embodiment of the present invention would result in a significant reduction of the number of valves and conduits. In fact, only gas source and outlet valves are needed up- and downstream a manifold to facilitate simultaneous refueling of a plurality of fuel cell vehicles such a plurality of busses. A reference to a fuel cell vehicle may in an embodiment of the invention include a vehicle having an internal hydrogen combustion engine.

It should be noted that a refueling according to the present invention is considered started when a flow of hydrogen gas can be allowed from a source to a receiving vessel i.e. in practise when a receiving vessel is connected to a hose. Accordingly, two simultaneous refuelings may be in progress even though there are no flow from any hydrogen source to any receiving vessel.

According to an embodiment of the invention, the pressure of hydrogen gas inside said first, second and third hydrogen gas sources are different.

The pressure of hydrogen gas within the first, second and third hydrogen gas sources may be the same. This would typically be the initial conditions when a receiving vessel is to be filled for the first time after the hydrogen gas sources have been filled up. The pressure of hydrogen gas in two of these hydrogen gas sources may be the same or the pressure of hydrogen gas in the three hydrogen gas sources may be different from each other. This would typically be the initial conditions when a subsequent receiving vessel is to be filed. The more different gas pressure that are available, the higher flexibility and degree of exploration of the available hydrogen gas is possible. Hence, a flexible and more efficient mobile refueling station is obtained. Flexible in that higher number of start pressures are available and efficient in that more of the hydrogen gas can be delivered to receiving vessels without the use of a compressor. The latter due to an increased number of possible cascade steps in a cascade refueling of a receiving vessel.

According to an embodiment of the invention, a source of said flow of hydrogen gas to said first receiving vessel is different from a source of said flow of hydrogen gas to said second receiving vessel.

This is advantageous in that it has the effect, that refueling of a first and a second receiving vessel can be made simultaneously where the first receiving vessel is refueled from a gas source having a first pressure and the second receiving vessel is refueled from a gas source having a second pressure different from the first pressure. Thereby, refueling of the second receiving vessel can be started at a point in time were refueling of the first receiving vessel is in progress. Further, refueling of the second receiving vessel can start at a pressure that is different from the pressure with which the first receiving vessel is refueled. The sources may be any of the sources available in the mobile hydrogen refueling station.

According to an embodiment of the invention, said mobile refueling station further comprises an outlet valve which is part of said conduit system fluidly connecting said hose with said first, second and third hydrogen gas source.

Preferably each of the hoses of the mobile hydrogen refueling station is associated with an outlet valve. The outlet is advantageous in that by closing this valve, the flow of hydrogen gas to the associated hose can be stopped and thereby the refueling of a receiving vessel can be stopped or paused or the hose can be disconnected from the mobile refueling station.

According to an embodiment of the invention, said mobile refueling station further comprises a plurality of regulating valve.

Preferably each of the hoses of the mobile hydrogen refueling station is associated with a regulating valve. The regulation valve and the hose valve may be one and the same valve. A regulation valve is advantageous in that it has the effect, that the flow of hydrogen gas to the receiving vessel can be regulated and thereby, a pressure difference between source and receiving vessel can be compensated for. The regulation of flow may be based on any relevant refueling parameters such as temperature and/or pressure and/or density in the receiving vessel or in a hydrogen gas source, price related information such as a maximum price a user is willing to pay for a refueling, etc. just to mention a few. The regulating valve may be any kind of an orifice reducing valve such as a mass flow regulating valve, pressure regulation vales, metering valve, etc. An array of fixed orifices having different sizes via which valves can control flow to a receiving vessel may be used as an alternative way of regulating gas flow. Yet another alternative is pipe parts having a variable orifice.

According to an embodiment of the invention, said mobile refueling station further comprises a hose buffer storage located downstream said hose valve.

A hose buffer storage is advantageous in that it has the effect, that even when the hose valve is closed, refueling of the receiving vessel connected to the hose can continue with hydrogen gas from the hose buffer storage. The hose buffer storge is filled with hydrogen gas to a pressure equal to the hydrogen gas source to which the hose is fluidly connected.

According to an embodiment of the invention, said hose buffer storage is fluidly connected to said hose conduit part via a hose buffer valve.

Via a hose buffer valve, the controller is able to control when the hose buffer storage is to be filled or depleted.

According to an embodiment of the invention, said first or second hydrogen source comprises at least two hydrogen storage vessels, preferably at least three hydrogen storage vessels, most preferably at least four hydrogen storage vessels.

The number of individual storage vessels of one hydrogen source is balanced between the volume of the hydrogen gas storages and the number of different pressure levels that should be available on the mobile hydrogen refueling station. One hydrogen gas source may also be referred to as a hydrogen source section. The individual vessels of a hydrogen source may also be associated with a valve for controlling flow to and from the individual vessel.

According to an embodiment of the invention, the volumes of said first and second hydrogen source are different.

The volume of the hydrogen sources defined as high pressure storage (high pressure may be defined as a pressure between 350 bar and 1500 bar) may be desired larger than the volume of hydrogen sources defined as low pressure storage (low pressure may be defined as a pressure below 350 bar).

According to an embodiment of the invention, said first and second hydrogen source is fluidly connected to said conduit system via a gas source valve.

With the gas source valve, the controller is able to connect/disconnect a hydrogen source from the conduit system.

According to an embodiment of the invention, said first and second hydrogen source is fluidly connectable via a gas section valve.

With the gas section valve, the controller is able to combine the volume of a plurality of hydrogen sources. This is advantageous in that it then becomes possible to only open for a smaller volume of high-pressure hydrogen gas at the time. Thereby increasing the cascade steps of a refueling, but also emptying the hydrogen gas storage of the mobile refueling station better.

According to an embodiment of the invention, said mobile refueling station comprises at least 5 hydrogen gas sources, preferably at least 10 hydrogen gas sources, most preferably at least 15 hydrogen gas sources.

As mentioned, on one hand the higher number of individual controllable hydrogen gas sources, the more flexible and efficient the mobile refueling station will be. On the other hand, the volumes of the sources will be reduced, and the conduit system will be more complex with an increased number of hydrogen sources. Between 5 and 10 hydrogen gas sources may be appropriate in one embodiment of the invention.

According to an embodiment of the invention, at least part of said conduit system is implemented as a manifold.

This is advantageous in that it has the effect, that manual work related to assembling the conduit system is reduced.

According to an embodiment of the invention, said conduit system comprises at least one sensor unit such as a temperature sensor and/or at least one pressure sensor.

According to an embodiment of the invention, at least 3, preferably at least 5, most preferably up to 10 individual receiving vessels are simultaneously connectable to sad conduit system.

Having below 10 individual receiving vessels such as between 2 and 5 (both included) is applicable in one use/embodiment where the mobile refueling station is used as refueling station for a fleet of fuel cell vehicles counting a limited number of vehicles such as 5-1. It should be mentioned that depending on design of the mobile refueling station e.g. 5 individual receiving vessels can be connected to said conduit system either via a manifold, via hoses or via a combination of manifold and hoses.

According to an embodiment of the invention, at least 10, preferably at least 25, most preferably 50 individual receiving vessels are simultaneously connectable to said conduit system.

Having any number above 2, 5, 10, 15 and up to e.g. 50 or more fuel cell vehicles with individual receiving vessels connected to the mobile refueling station is applicable when the mobile refueling station supplies a larger fleet of fuel cell vehicles. Hence a plurality of connection possibilities for fuel cell vehicles to the mobile refueling station enables continuous refueling, simultaneous end of refuelings, disconnection and connection of a plurality of e.g. fuel cell busses.

The average time for refueling e.g. 10 fuel cell busses from a mobile refueling station without a cooling system according to the present invention, would be the same compared to refueling from e.g. a stationary refuelings station having a system for cooling the gaseous hydrogen before it enters the receiving vessels/receiving vessels system of the busse(s). Whereas the time for refueling the individual of the 10 fuel cell busses from a mobile refueling station without a cooling system according to the present invention would be longer compared to refueling from e.g. a stationary refuelings station having a system for cooling the gaseous hydrogen before it enters the receiving vessels/receiving vessels system of the busse(s).

Being able to connect e.g. 4-6 or more individual receiving vessels i.e. 4-6 or more individual fuel cell vehicles is advantageous in that it allows simultaneous refueling of 4-6 or more fuel cell vehicles.

According to an embodiment of the invention, said at least 15 individual receiving vessels are connected to said conduit system via a fueling pipe.

The implementation of the plurality of connections as a fueling pipe is advantage in that fuel cell vehicles can be spaced from each other during refueling and no individual hose from fuel cell vehicle to the conduit system is needed only from fuel cell vehicle to fueling pipe. A fueling pipe/a manifold is advantageous when several receiving vessels are to be connected to the conduit system to avoid too many too long hoses.

Note that the term individual receiving vessels may refer to a set of one or more receiving vessels of e.g. a fuel cell vehicle.

According to an embodiment of the invention, said mobile hydrogen refueling station is configured for, in one cycle, to refuel at least 10 heavy-duty vehicles, preferably at least 20 heavy-duty vehicles, most preferably 30 heavy-duty vehicles.

According to an embodiment of the invention, said first or second receiving vessels is a receiving vessel of one of the list comprising: stationary hydrogen storage, mobile hydrogen storage, heavy duty vehicle, light duty vehicle, areal vessel, train and ship.

In practise, the receiving vessel can be of any type and part of any system also including industrial processes.

According to an embodiment of the invention, said mobile hydrogen refueling station is a multiple elements gas container trailer.

According to an embodiment of the invention, said mobile hydrogen refueling station is skid mounted.

According to an embodiment of the invention, said controller is configure for pausing refueling of said first receiving vessel before initiating refueling of said second receiving vessel.

Pausing refueling of the first receiving vessel while refueling the second receiving vessel is advantageous in that it has the effect, that temperature of the first receiving vessel can decrease while the second receiving vessel is being refueled. Thereby it is ensured that the temperature of the first receiving vessel is kept below a maximum receiving vessel temperature without having a cooling system on the mobile refueling station.

Pausing the refueling to reduce temperature increase is counter intuitive to the obvious solution to the problem of reducing temperature which is a continuous gas flow with a reduced gas flow speed.

According to an embodiment of the invention, said controller is configure for pausing refueling of said second receiving vessel before resuming refueling of said first receiving vessel.

Pausing refueling of the second receiving vessel while refueling the first receiving vessel is advantageous in that it has the effect, that temperature of the second receiving vessel can decrease while the first receiving vessel is being refueled. Thereby it is ensured that the temperature of the second receiving vessel is kept below a maximum receiving vessel temperature without having a cooling system on the mobile refueling station.

According to an embodiment of the invention, said controller is configured for resuming refueling of said first receiving vessel based on temperature of the hydrogen gas inside said first receiving vessel.

This is advantageous in that it has the effect, that the time for refueling the first and second receiving vessels can be optimize i.e. shortened in that the refuelings can be controlled according to temperature and thereby there is no risk of stopping the refueling due to reaching a maximum receiving vessel temperature is reduced.

The temperature of hydrogen gas in the receiving vessel can be received from a temperature sensor associated with the receiving vessel, it can be estimated or simulated, etc.

Note that in the same way, the controller is configured for resuming refueling of the second receiving vessel based on temperature of the hydrogen gas inside the second receiving vessel.

According to an embodiment of the invention, said controller is configured for resuming refueling of said first receiving vessel after expiry of a period of time starting when the refueling of said first receiving vessel is paused.

This is advantageous in that it has the effect, that it is a very simple way of ensuring a temperature reduction in the receiving vessels during the time where the flow of hydrogen gas is paused.

Note that in the same way, the controller is configured for resuming refueling of the second receiving vessel after expiry of a period of time starting when the refueling of the second receiving vessel is paused.

The time period of a pause may be defined in seconds or minutes e.g. as the time a temperature decrease of e.g. between 5 and 15° C. happens.

According to an embodiment of the invention, a pause is defined as a gaseous flow below 0.001 kg per second.

A pause may either be a stop of flow or a reduction of flow (between gas source and receiving vessel) that will facilitate a temperature decrease in the receiving vessel, hence only by reducing (or stopping) flow of gas to a receiving vessel a temperature decrease can be obtained. Hence, a temperature reduction may depend on flow to the receiving vessel, area of the receiving vessel, ambient temperature, etc. One key to be able to refuel a plurality of fuel cell vehicles simultaneously (with or without parallel flow) from a mobile refueling station is the thermic time constant in the receiving vessel systems.

The invention relates to a mobile refueling station described in paragraphs 5-64 operated according to a method described in paragraphs 66-139.

Moreover, an aspect of the invention relates to a method of controlling a mobile hydrogen refueling station to perform simultaneous refueling of a first receiving vessel fluidly connected to a first hose and of a second receiving vessel fluidly connected to a second hose, said mobile refueling station comprises: at least three hydrogen gas sources each of which are fluidly connectable to said first and to said second hose via a hydrogen conduit system, a controller controlling a plurality of conduit valves of said hydrogen conduit system and thereby controlling the flow of hydrogen gas from each of said at least three hydrogen gas sources to said first and second receiving vessels respectively. wherein said controller, during control of refueling of said first receiving vessel from a first refueling source of said at least three hydrogen gas sources, initiates the following steps: establishing an initial pressure of hydrogen gas in said second receiving vessel connected to said second hose, selecting a second refueling source among said at least three hydrogen gas sources having a hydrogen gas pressure above said initial pressure, opening at least one of said conduit valves thereby allowing hydrogen gas to flow from said second refueling source to said second receiving vessel.

This is advantageous in that it has the effect that the time of filling two receiving vessels from a mobile refueling station without a cooling system according to the present invention can be the same as the time of refueling two receiving vessels one after the other from a mobile refueling station having a cooling system for cooling the hydrogen gas before entering the receiving vessels. Of course this, at least to some extent, depends on ambient temperature, number of simultaneous refuelings, etc. hence the more simultaneous refuelings and the lower ambient temperature, the faster individual and average refueling Further, it has the effect of allowing simultaneous or synchronous refueling of more than one receiving vessel from different hydrogen gas sources. Thus, allowing receiving vessels of different pressure to be refueled simultaneously.

It should be noted that a refueling according to the present invention is considered started when a flow of hydrogen gas can be allowed from a hydrogen gas source to a receiving vessel i.e. in practise when a receiving vessel is connected to a hose. Accordingly, two simultaneous/synchronous refuelings may be in progress even though there are no flow from any hydrogen source to any receiving vessel. During synchronous refueling of two or more receiving vessels parallel flow to two or more of these two or more receiving vessel may be established.

Further, the simultaneous refuelings may also be referred to as asynchronous with respect to the pressure in the first and second receiving vessels. Hence, the pressure in the first and second receiving vessels may not be the same during the individual refuelings thereof. The target pressure/density may however be the same.

Conduit valves should be understood as any of the valves in the conduit system associate with flow of gas from a gas source to a receiving vessel.

According to an embodiment of the invention, a refueling of a receiving vessel includes the following steps:

connecting a receiving vessel to a hose, establishing an initial pressure of hydrogen gas in said receiving vessel, selecting a hydrogen refueling source among said at least three hydrogen gas sources having a hydrogen gas pressure above said initial pressure, opening at least one conduit valve to allow flow of hydrogen gas from said selected hydrogen refueling source to said receiving vessel, and closing said at least one conduit valve.

It should be mentioned that the initial pressure may be received from the receiving vessel system or determined by opening a flow path in the conduit system between a receiving vessel and a hydrogen gas source. When flow is established, the pressure of the receiving vessel can be measured on the mobile refueling station.

According to an embodiment of the invention, said controller controls said plurality of conduit valves to allow flow in said first hose and in said second hose simultaneously.

This is advantageous in that it has the effect that two receiving vessels can be refueled in parallel i.e. faster than if one refueling should wait to begin until flow is paused in a refueling already in progress.

According to an embodiment of the invention, said controller controls said plurality of conduit valves to allow flow in said first hose and to not allow flow in said second hose or vice versa.

According to an embodiment of the invention, said controller controls said plurality of conduit valves to not allow flow in any of said first and second hoses.

This is advantageous in that then there is no need for a cooling system on the mobile refueling station. This is because the heat generated as the pressure increases in the receiving vessel is distributed along the outer walls of the receiving vessel to the surroundings during the period with no pressure increase i.e. during the periods of time where no flow is allowed to receiving vessels connected to the conduit system.

According to an embodiment of the invention, said controller initiates refueling of said first receiving vessel and subsequently initiates refueling of said second receiving vessel wherein there is a pressure difference between pressure in said first and in said second refueling vessel of at least 20 bar, preferably at least 50 bar, most preferably 100 bar.

This is advantageous in that it has the effect, that two simultaneous refuelings do not have to be initiated simultaneously. Further, there are no limits for when refueling of a second receiving vessel can be initiated. This is due to the possibility of controlling flow from gas sources having different pressures.

According to an embodiment of the invention, said first refueling source and said second refueling source are the same hydrogen gas source.

This is advantageous in that the pressure in the first refueling source is reduced faster than if only one receiving vessel is filled from the first refueling source. Having the same refueling source is possible if the pressure in the two receiving vessels is substantially the same. Substantially the same should here be understood as within a range of e.g. 0-75 bar.

According to an embodiment of the invention, said first refueling source and said second refueling source are different hydrogen gas sources.

This is advantageous in that it has the effect, that receiving vessels with different pressures can be refueled simultaneously. Different pressure may e.g. be a difference of more than 20-50 bar.

According to an embodiment of the invention, the hydrogen gas pressure of said first refueling source and of said second refueling source are the same.

As mentioned, same pressure should be understood as substantially the same pressure such as within a range of e.g. 0-50 bar.

According to an embodiment of the invention, flow of hydrogen gas to and from an individual of said at least three hydrogen gas source is controlled by a gas source valve associated with said individual hydrogen gas source.

According to an embodiment of the invention, flow of hydrogen gas to and from each individual of said first and second hoses is controlled by an outlet valve associated with said individual hose.

Hydrogen gas sources and receiving vessels are fluidly connected via the conduit system. For controlling flow of hydrogen gas in the conduit system, the controller controls status of a plurality of valves. The control is made based on e.g. measurements of pressure, temperature, mass flow, etc.

According to an embodiment of the invention, at least a first and a second hydrogen gas sources are fluidly connected via a first gas section valve.

According to an embodiment of the invention, said second and third hydrogen gas sources are fluidly connected via a second gas section valve.

Section valves are advantageous in that by controlling these, the volume of sections of the hydrogen gas storage can be adjusted as the different hydrogen gas sources are depleted.

According to an embodiment of the invention, flow to said first receiving vessel is controlled by a set of first conduit valves comprising a first outlet valve and a first hydrogen gas source valve, and wherein flow to said second receiving vessel is controlled by a set of second conduit valves comprising a second outlet valve and a second hydrogen gas source valve.

According to an embodiment of the invention, said controller allows flow from said one hydrogen gas storage to both of said first and second receiving vessels, if the difference in pressure between pressure of said first receiving vessels and pressure of said second receiving vessel is below a threshold pressure.

According to an embodiment of the invention, said threshold pressure is 75 bar, preferably 45 bar, most preferably 20 bar.

If two receiving vessels having substantially the same pressure are connected to the first and second hoses respectively, refueling of these two receiving vessels can be made parallel with more or less identical pressure ramp rates.

Also, if one receiving vessel is being refueling at a given pressure and a refueling of a second receiving vessel with a substantially similar pressure is to be initiated, the hydrogen gas source can be the same for the two refuelings. When connected there will be a parallel flow of gas from the gas source to the two receiving vessel.

Substantially the same pressure should be understood as a pressure difference that does not exceed e.g. 50-75 bar.

According to an embodiment of the invention, said threshold pressure is dynamic and changes with pressure of a pressure ramp rate according to which refueling one of said first receiving vessel and said second receiving vessel are controlled.

The differential pressure between two receiving vessels or between one receiving vessel and one gas source used by the controller to determine when to shift gas source or when to allow flow from the same gas source to two receiving vessels may be higher when the pressure of the two receiving vessels is low (e.g. below 200 bar) compared to when the pressure of the two receiving vessels is high (e.g. above 200 bar). Hence, the flow of gas to a receiving vessel can be the same in the situation where the gas pressure in the receiving vessel is high and the differential pressure is low as in the situation where the gas pressure in the receiving vessel is low and the differential pressure is high.

The threshold pressure may also be used by the controller to determine when to perform a shift of gas source.

According to an embodiment of the invention, said controller allows flow to a receiving vessel if the temperature is below a threshold temperature.

To avoid overheating of the receiving vessel, the controller continues or at discrete time steps establishes temperature of the receiving vessel. If the established temperature of the receiving vessel is above a defined maximum temperature, the flow of hydrogen gas to the receiving vessel is stopped/paused. During the time with no flow, heat can be emitted to surroundings of the receiving vessel. By including such step on a refueling method, the need for a cooling system on the mobile refueling station is eliminated.

As the threshold pressure, the threshold temperature may also be dynamic i.e. following a ramp that increases with pressure in the relevant receiving vessel(s). This means that higher flow (e.g. from 60 gam per second to 120 gram per second or higher) can be allowed to a receiving vessel if the temperature is low (such as e.g. below 10° C.) compared to the situation where temperature is high (such as e.g. above 70° C.).

According to an embodiment of the invention, said controller stops flow to a receiving vessel after a period of time has passed.

According to an embodiment of the invention, said controller stops flow to a receiving vessel after a certain pressure increase per time unit.

The fact that temperature increases as gas pressure increases can also be handled without having a cooling system e.g. by continuous conservative refueling. Such slow pressure increase will however prolong the refueling time that is not desired for a user of e.g. a fuel cell vehicle. Alternative, the refueling/the flow of hydrogen gas to the receiving vessel can be stopped at predefined time during the refueling. The stop or pause can also be of a predefined duration. Alternative, the refueling may be paused after a certain pressure increase during a certain time period. These latter examples can be implemented if no information of temperature development in the receiving vessel is available. The time periods and/or the pressure increase vs time can be defined e.g. based on historic data, simulations, etc.

According to an embodiment of the invention, said controller terminates flow to a receiving vessel when the state of charge of said receiving vessel is above 85%, preferably above 90%, most preferably above 95%.

At a state of charge of 100%, the receiving vessel is full. The state of charge percentage is dependent on pressure and temperature hence, the state of charge can be calculated based on measurements of these parameters or other parameters from which density can be derived or calculated. In some embodiments, 100% state of charge may be defined as reached when the target pressure in a receiving vessel is reached at a temperature of 15° C. Hence, if a refueling has a target pressure of 350 bar, 100% state of charge is reached when the density reaches the density of said gas at a pressure of 350 bar at 15° C. This density for hydrogen gas in one example may be 24 $kg/m^3$. An alternative target pressure may be 700 bar or 750 bar just to mentioned to of a plurality of target pressures.

According to an embodiment of the invention, said conduit valves are controlled based on temperature of gas in one or more receiving vessels.

According to an embodiment of the invention, said temperature is measured in said one or more receiving vessels.

According to an embodiment of the invention, said temperature is estimated based on ambient temperature and measured pressure increase over time.

Temperature can be estimated if not temperature sensor/measurement is available e.g. by extrapolation of existing temperature based on simulation/modelling of temperature development or based on simulation of a digital twin of receiving vessel.

According to an embodiment of the invention, refueling of said first receiving vessel is controlled to be conducted in a plurality of successive steps of start and stop of the flow of hydrogen gas to said first receiving vessel.

The stops are advantageous in that there is no pressure increase in the receiving vessel and thus no temperature increase. Instead during the stops heat can be emitted to the surroundings of the receiving vessel.

According to an embodiment of the invention, refueling of said second receiving vessel is controlled to be conducted in a plurality of successive steps of start and stop of the flow of hydrogen gas to said second receiving vessel.

By controlling refueling of both the first and the second receiving vessels according to such pulsed flow of hydrogen gas, continuous flow from the mobile hydrogen refueling station to at least one receiving vessel is ensured.

According to an embodiment of the invention, the simultaneous refueling of said first and second receiving vessels include a time period with flow to only one of said first and second receiving vessels and a subsequent time period with flow to both of said first and second receiving vessels.

This is advantageous in that the temperature in the receiving vessel to which flow is decreased/stopped has decreased between e.g. 5° C. and 30° C. prior to re-establishing the flow. Depending on initial conditions (e.g. start temperature, start pressure, ambient temperature) the pressure in one receiving vessel may catch the other and thus towards the end of the refueling (e.g. the last 50 bar of pressure increase) flow (e.g. from the same gas source) may be established to the two receiving vessels The temperature decrease when flow is paused is higher when pressure in the receiving vessel is far from target pressure compared to when pressure in the receiving vessel is closer to its target pressure. This is to avoid starting and stopping the flow too many times during a refueling.

According to an embodiment of the invention, said plurality of successive steps of start and stop includes at least 5 stops, preferably at least 7 stops, most preferably 10 stops.

According to an embodiment of the invention, said controller controls refueling of at least 3 receiving vessels simultaneously, preferably at least 5 receiving vessels simultaneously, most preferably at least 7 receiving vessels simultaneously.

This is advantageous in that the method allows filling of e.g. 5 busses from a mobile refueling station without cooling with in a time period a stationary refueling station would take to fill 5 busses one after the other. Hence if such a mobile refueling station is to fille 5 busses it may take 50 minutes i.e. 10 minutes per bus. The mobile refueling station without cooling system using the pulsed refueling method of the present invention would also be able to refuel the 5 busses in about 50 minutes, however the refueling of individual bus would take more than 10 minutes.

According to an embodiment of the invention, the duration starting at a stop and ending at a subsequent start is longer than the duration starting at said start and ending at a subsequent stop.

According to an embodiment of the invention, the duration starting at a start and ending at a subsequent stop is longer than the duration starting at said stop and ending at a subsequent start.

According to an embodiment of the invention, said stops of said refueling of said first receiving vessel is coincident with said starts of said refueling of said second receiving vessel.

According to an embodiment of the invention, said stops of said refueling of said first receiving vessel are longer than said stops of said refueling of said second receiving vessel or vice versa.

In this way the refueling of one receiving vessel is controlled more aggressive than the refueling of another receiving vessel. This may be due to the fact that the one receiving vessel has a lower initial temperature, lower initial pressure, larger volume, etc. In this situation, the receiving vessel being refueled more aggressive may reach 100% state of charge before the other receive vessel even though the refueling of this other receiving vessel was initiated first.

According to an embodiment of the invention, said refueling of said first receiving vessel is continued while said refueling of said second receiving vessel is stopped or vice versa.

The above-mentioned different ways of controlling the pulsed refueling is advantageous in that thereby it is possible to control the thermic development of the individual receiving vessels and thereby avoid a temperature in the receiving vessels exceeding a temperature threshold of e.g. 75° C., 80° C. or 85° C.

According to an embodiment of the invention, prior to stating up said flow of hydrogen gas to a receiving vessel, the pressure of said receiving vessel is established and matched with at least one of said at least three hydrogen gas sources.

Preferably the match is made prior to each starting up in that during the pause (stop period of the pulsed refueling) other receiving vessels may be refueled thereby changing the pressure in the hydrogen gas sources. Therefore, it is not necessarily the hydrogen source supplying the receiving vessel before stopping that is the optimal hydrogen source when starting again. Optimal should here be understood as optimal with respect to the overall usage of the hydrogen gas sources of the mobile hydrogen refueling station.

According to an embodiment of the invention, during one of said stops of said first or second refueling, the hydrogen gas source is changed to a hydrogen gas storage having a higher gas pressure.

According to an embodiment of the invention, a pressure ramp rate of pressure increase in said first receiving vessel is steeper than a pressure ramp rate of pressure increase in said second receiving vessel or vice versa.

The pressure ramp rate may be determined by initial pressure, initial temperature or the like of the receiving vessel.

According to an embodiment of the invention, said controller selects a gas source according to a pressure profile for said plurality of gas sources.

This is advantageous in that it has the effect, that thereby pressure in the individual gas sources can be controlled so as to have the optimal relationship of pressure between the plurality of ga sources.

According to an embodiment of the invention, said controller is implemented as a first and a second controller.

One controller may be dedicated to a refueling of one receiving vessel and a second controller may be dedicated to a refueling of a second receiving vessel.

The invention relates to a method described in the paragraphs 66-139 controlling a mobile refueling station described in the paragraphs 5-64.

THE DRAWINGS

Figure 2A:
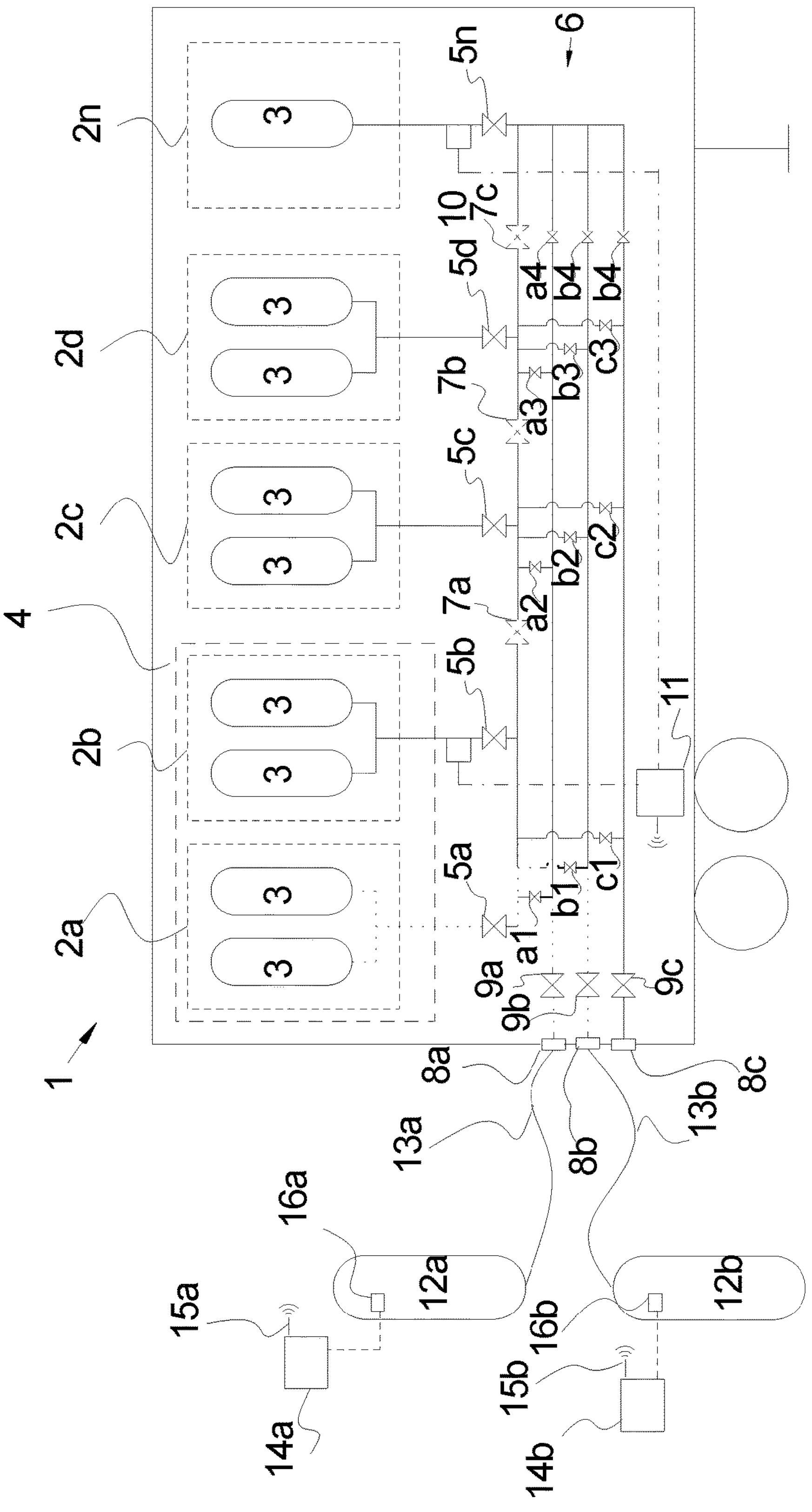
Figure 2B:
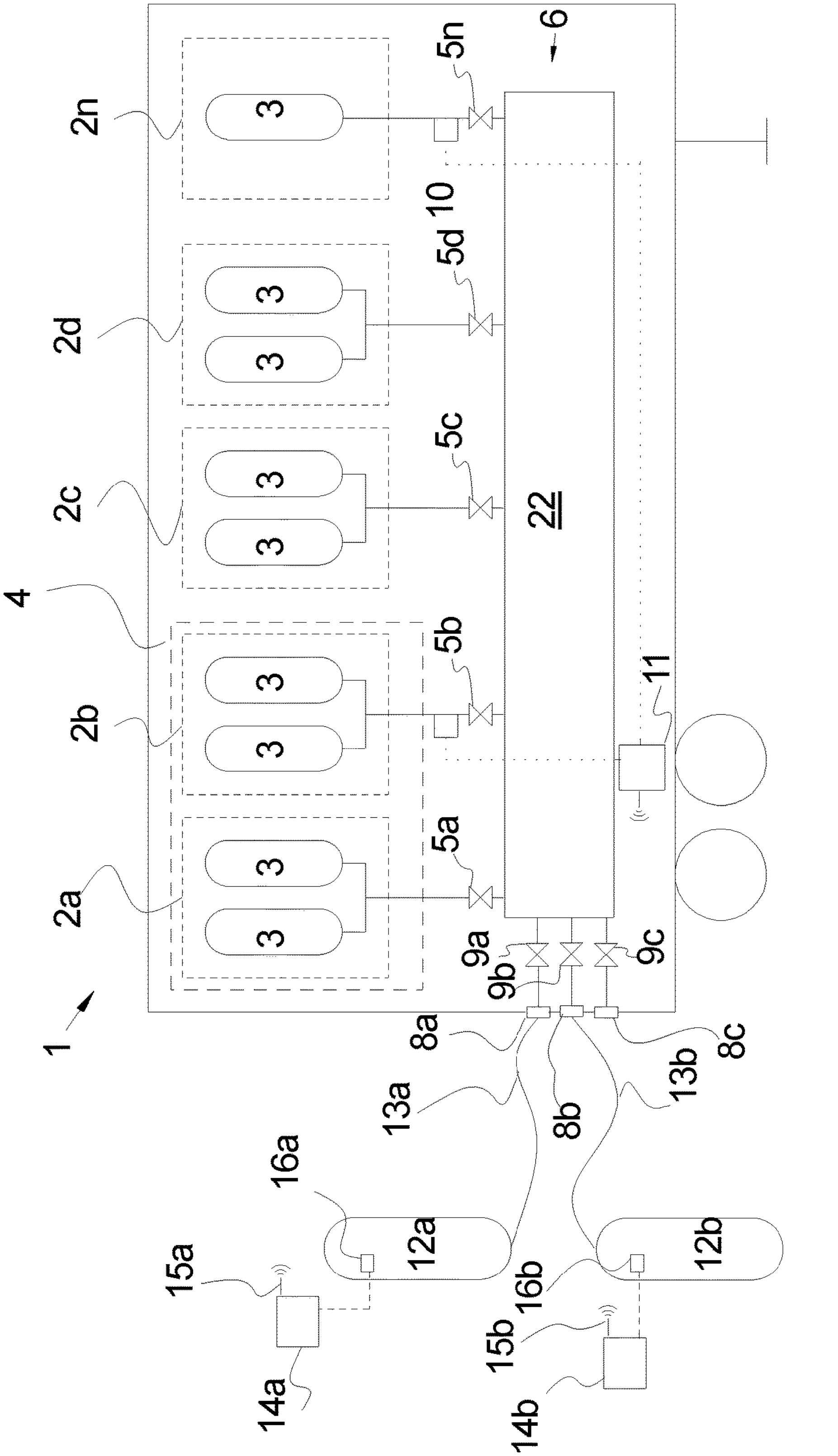
Figure 3A:
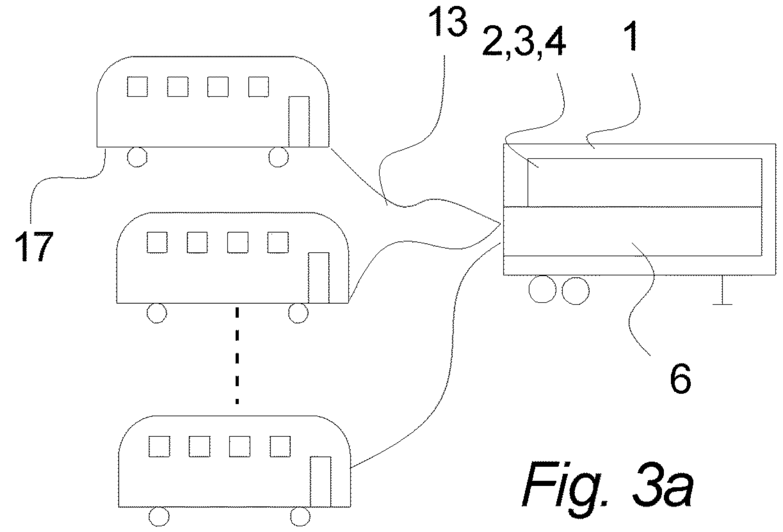
Figure 3B:
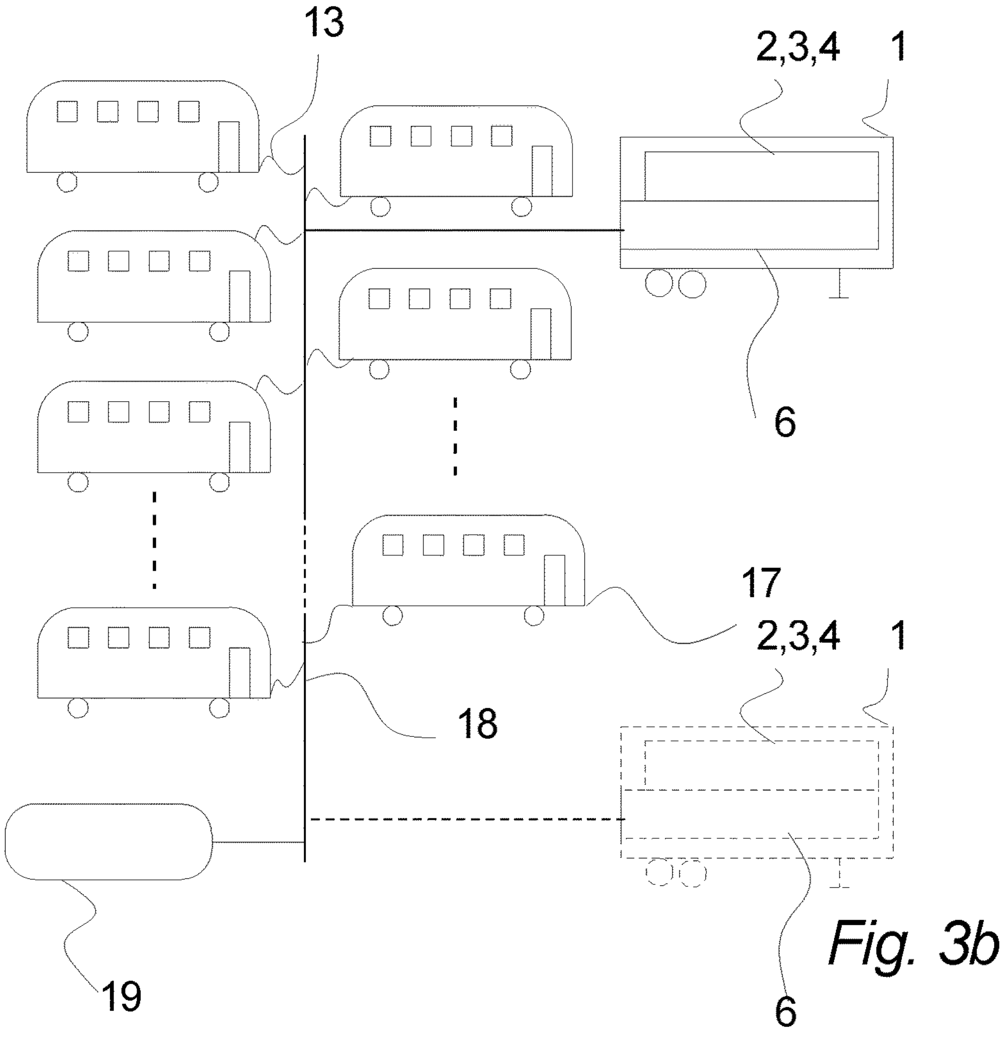
Figure 4A:
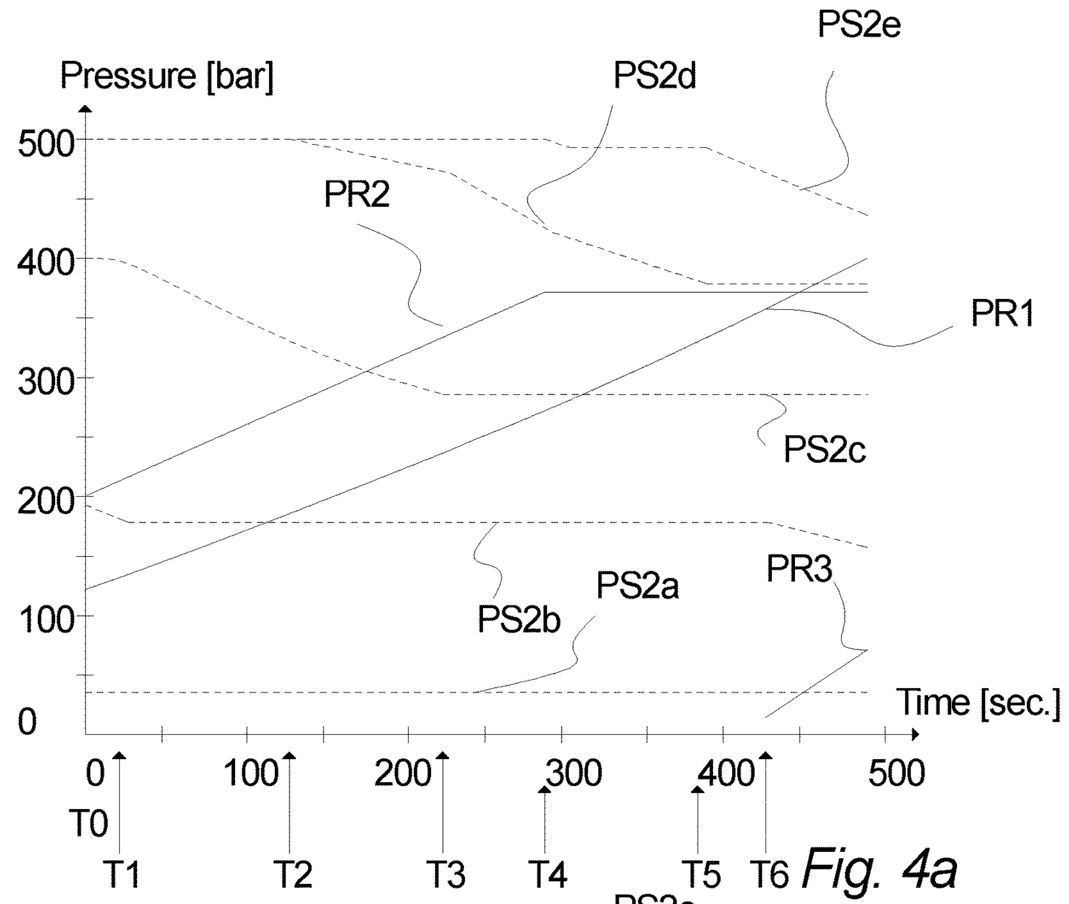
Figure 4B:
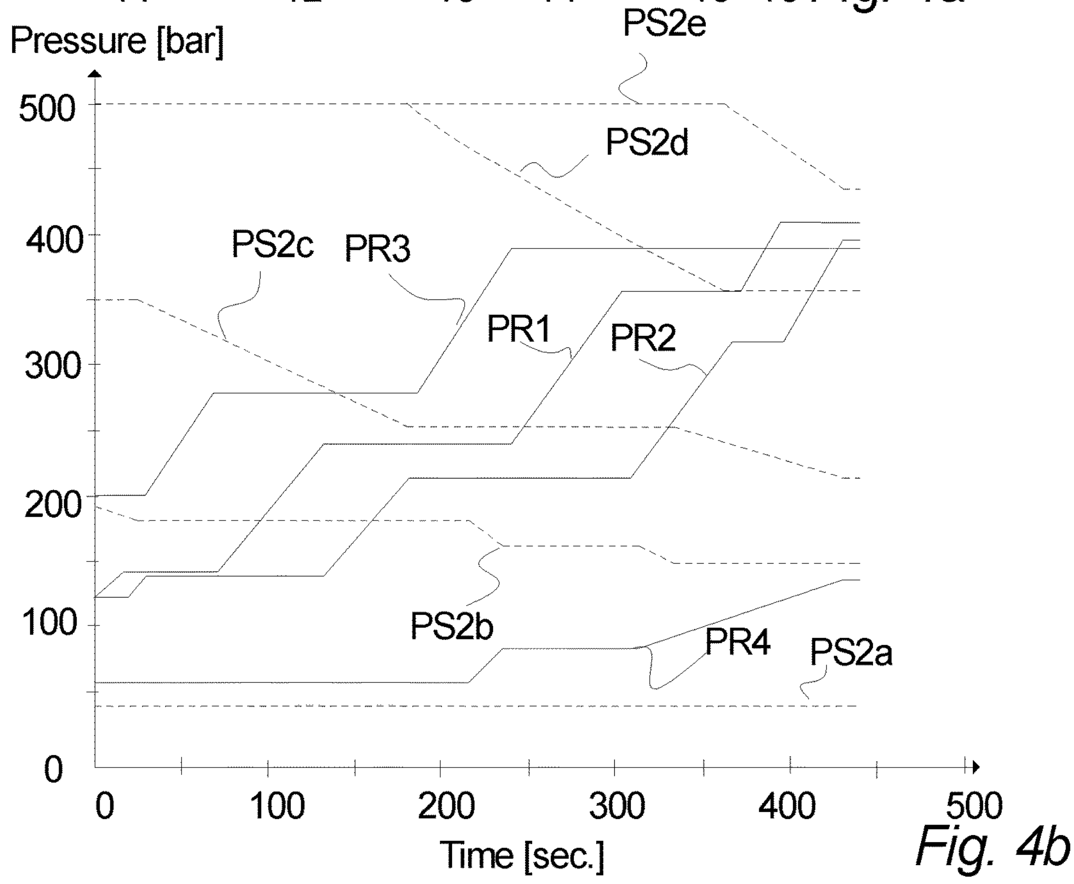
Figure 5A:
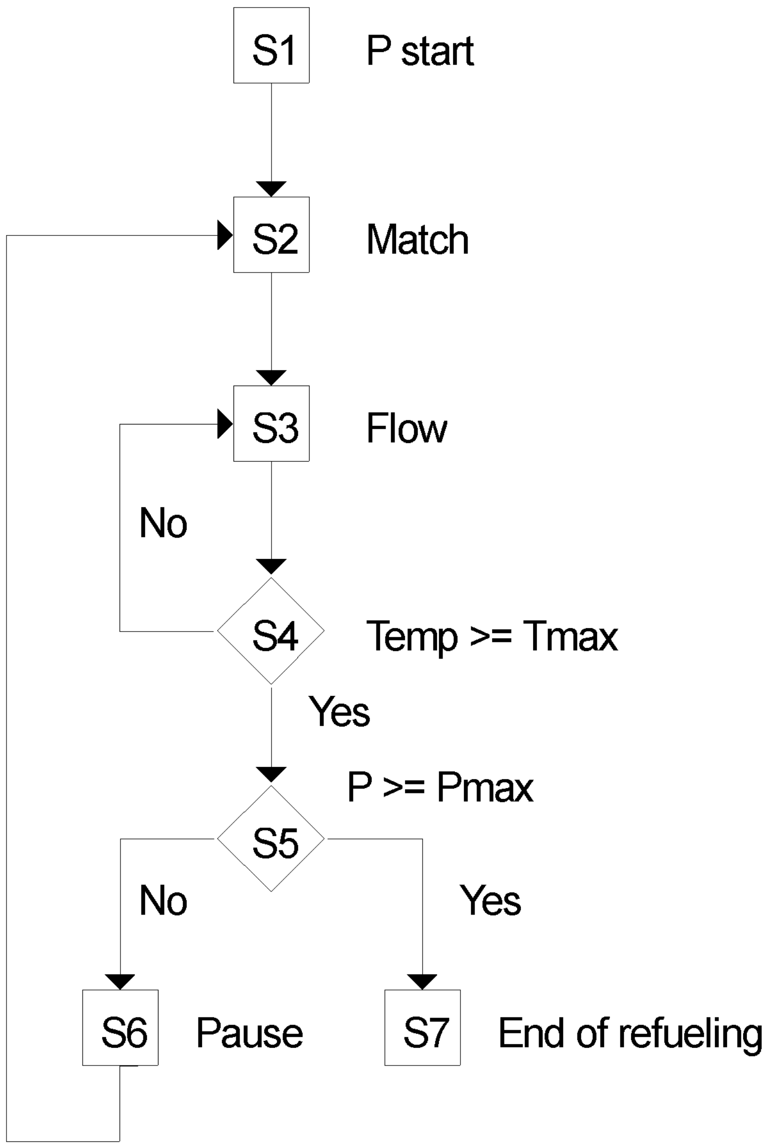
Figure 5B:
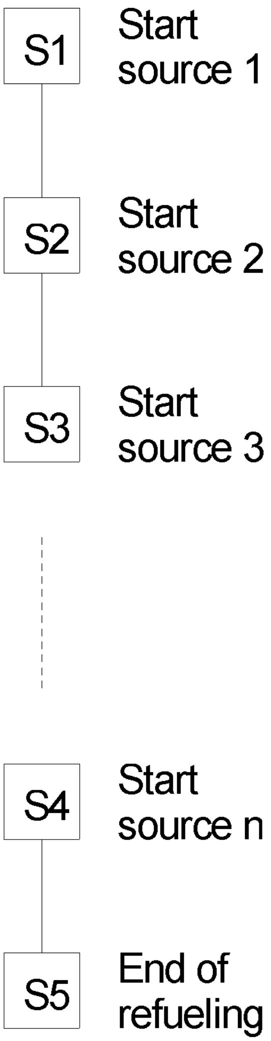

For a more complete understanding of this disclosure, reference is now made to the following brief description, taken in connection with the accompanying drawings and detailed description, wherein like reference numerals represent like parts. The drawings illustrate embodiment of the invention and elements of different drawings can be combined within the scope of the invention:

FIG. 1 illustrates a mobile refueling station,

FIG. 2*a*, 2*b* illustrates a mobile refueling station refueling two receiving vessels simultaneously, FIG. 3*a*, 3*b* illustrates a mobile refueling station having a capacity of X synchronous refuelings that is refueling Y receiving vessels FIG. 4*a*, 4*b* illustrates pressure ramp rates for synchronous refueling of several receiving vessels, and FIG. 5*a*, 5*b* illustrates a flow chart of the steps of the synchronous refueling of receiving vessels.

DETAILED DESCRIPTION

FIG. 1 illustrates a mobile hydrogen refueling station 1 according to an embodiment of the invention. The mobile hydrogen refueling station 1 (sometimes referred to simply as mobile station) comprises first, second, third, fourth and fifth hydrogen gas sources 2*a*-2*n* (sometimes referred to simply as gas source and commonly denoted 2) each comprising one or more hydrogen storage vessels 3 (sometimes referred to simply as storage vessel). The mobile hydrogen refueling station may be designed according to the ADR (ADR; Accord 23elative au transport international des marchandises Dangereuses par Route) standard and thus what is referred to as a MEGC (MEGC; Multi Element Gas Container) trailer or a battery vehicle.

The first and second hydrogen gas source 2*a*, 2*b* is in FIG. 1 illustrated as joined forming a gas section 4. Hence, the volume available for storing gas in section 4 is the volume of the storage vessels 3 of first and second gas sources 2*a*, 2*b*. Each of the storage vessels 3 and thereby the gas sources 2 are connected to a conduit system 6 via gas source valves 5 enabling control of flow from each individual gas source 2 to the conduit system 6. Together, the gas sources 2, storage vessels 3 and gas sections 4 may be referred to as gas storage.

Accordingly, when the mobile refueling station arrives at a refueling site, preferably each of the storage vessels 3 and thereby the gas sources 2 are filled to a start pressure between 350 bar and 1000 bar such as e.g. a pressure of 500, 600, 700, 800 or 900 bar. A first refueling may only require gas from the first, second and e.g. third gas sources 2*a*-2*c* and thus because of the gas source valves 5 the pressure in the fourth and fifth gas sources 2*d*, 2*n* remain at the start pressure.

In an embodiment of the invention, the volume of the gas sources 2 can be changed by controlling status of one or more of the gas section valves 7*a*-7*c* (illustrated by dashed lines). Hence, if gas section valve 7*a* is open while gas section valve 7*b* is closed, the volume of gas section 4 is increased with the volume of the storage vessels 3 of gas source 2*c*. Note that the gas section valves 7 are optional and thus the present invention may be implemented via a conduit system 6 without gas section valves 7. Including section valves in the conduit system may make the valves a1-c3 superfluous and in embodiment where the sectioning is not necessary, the section valves 7 are also not necessary. Hence, the simultaneous refueling of a plurality of receiving vessels (fuel cell vehicles) according to the refueling method of the present invention can be made with a significant reduction of valves. Thereby the cost and complexity of the mobile refueling station is reduced. Further, if the conduits are replaced by a single manifold, the complexity of the mobile refueling station design reduced further.

It should be mentioned that the mobile refueling station 1 illustrated on FIG. 1 is only an example of a mobile refueling station according to the invention. Thus, more or less valves, storages, sources, etc. may be required for a specific implementation of the present invention. Typically, the number of vessels, sections and banks is a customer/designer choice based on the application in which the mobile refueling station 1 is to be used and thus any combination of the illustrated elements that is physically and legally allowed to locate on a mobile refueling station is possible.

The mobile refueling station is not restricted to use any particular type of gas vessel 3, and a person skilled in the art may select any type of gas vessels 3, suitable for realizing the invention as long as they comply with requirements to at least gas and pressure they are to store. Particularly, gas vessels should be able to withstand and approved to be used for transportation of gaseous fluid pressures up to, for example, 500 bar, but gas vessels according to the invention are not restricted to this example of maximum pressure. Gas vessel 3 used in the gas sources 2 could in principle be any type as longs as they comply with local requirements to transport and storage of gaseous fluids in particular hydrogen gas.

The number of gas vessels 3 defining the volume of a gas source 2 can be 1 or more up to e.g. 15 individual gas vessels 3.

The mobile refueling station 1 comprises a conduit system 6, which fluidly connects the gas sources 2 to a first, second and third outlet connection 8*a*-8*c* via a plurality of gas flow direction valves a1-a4, b1-b4, c1-c4. In other embodiments, the number of outlet connections is higher than three such as up to e.g. 10. Note that one outlet connection be supply a filling pipe having more than 10 outlet connections. Flow of hydrogen gas to the outlet connections 8*a*-8*n* can furthermore be controlled by outlet valves 9*a*-9*c*.

In an embodiment, the conduit system 6 comprises a hose buffer storage 20 illustrated with dashed lines connected to the part of the conduit system establishing flow to outlet connection 8*c*. It should be mentioned that upstream all outlet connections 8 a hose buffer storage 20 may optionally be located. The hose buffer storage 20 is connected to the conduit system 6 via a hose buffer valve 21. When the hose buffer valve is opened, the pressure of gas in the hose buffer tank will equalize with the upstream gas source 2 to which flow is established. Hence, in FIG. 1, if flow is established between gas source 2*a* and outlet connection 8*c* and hose buffer valve 21 is opened, the pressure in hose buffer storage 20 will equalize pressure in gas sourced 2*a*. Hence, gas flow from the gas buffer storage 20 can be maintained if flow is terminated from gas source 2*a*. The gas buffer is especially advantageous if valves are implemented as an array of orifices.

In an embodiment, outlet valve 9 may control flow to more than one outlet connection 8 and thereby to more than one receiving vessel. This is illustrated on FIG. 1 by outlet valve 9*c* which is connected to outlet connection 8*c* and the dashed outlet connection 8*n*. Note that all of the outlet valves 9 may be connected to one more outlet connections.

At least when e.g. two receiving vessels are having the same gas pressure this is advantages or when a paused refueling method is implemented. Then, when two refuelings are made simultaneous but only with flow to one receiving vessel at the time the same outlet valve 9 can be used for two simultaneous refuelings. The outlet valve 9 may in this and other embodiments be referred to as a gas flow regulation valve regulating gas flow to receiving vessels.

The mobile refueling station 1 may be built up of on a truck trailer chassis carrying storage vessels 3 e.g. in the form of tubes that as mentioned can store hydrogen gas at controlled pressure. Alternatively, the mobile refueling station 1 is skid mounted and thereby possible to lift from one location to another. If the mobile refueling station is built on skids, typically one or more hydrogen gas sources skids and a valve/control skid would be required.

Independent of the type of implementation of the mobile refueling station it may comprise a cooling system and still perform refuelings according to the methods described in this document. The pauses may thus not be as many or as long. The length/number of pauses may depend on the capacity of the refueling station, ambient temperature, number of simultaneous refuelings, time since last refueling, etc. Thus even a small cooling system may facilitate a reduction in number of pauses and length thereof during a refueling.

The valves used to control flow of hydrogen gas may be any suitable type of valves such as block and bleed valves, air-operated valves, solenoid valves, directional control valves, gate valves, etc. Air-operated valves can for example be operated using an internal or external pressure source part of or connected to the mobile refueling station. Such a pressure source can for example be a compressor at a hydrogen refueling station. Alternatively, air-operated valves can be operated using an internal pressure source, for example from a compressed air brake system. Solenoid valves can for example be powered by a battery or fuel cell located on the trailer. Power to power consumers on the mobile refueling station may also be provided by cables from external fuel cell, battery, electric socket, or similar power supply.

Generally, embodiments of the invention are not restricted to any particular types of valves, and a person skilled in the art may select any valves, suitable for realizing the invention. In one embodiment, the valves are simple one way-valves (on/off valves) that allows or stops flow in a conduit of the conduit system 6. Depending on the configuration of the vales, pressure in vessels, etc. these one-way valves may allow a gas to flow in a first direction when a valve is first opened. When closed and subsequently opened again, the pressure in gas sources 2 may have changed so that now gas flow in the opposite direction. In this way flow direction can be changed by control of the valves and thus dynamic two-way flow in the conduit system can be established.

More specifically, the two-way flow in the conduit system is facilitated by controlling valves so that in one conduit/path flow is in the first direction and in another conduit/path flow is in the opposite direction. Direction may here be defined with respect to outlet, vessel, etc. One-way valves are advantageous in that the simplifies the design of the conduit system 6 compared to the use of multi-way valves or valves panels that required a higher number of conduits close together around such multi-way valve. In the present invention, being able to distribute one-way vales as desired between vessels/sections/sources is advantage in that it increases the flexibility in design of the mobile refueling station.

The valves of the mobile refueling station are distributed such that by control of the status of the source valves 5, section valves 7, outlet valves 9 and the gas flow direction valve a-d flow of gas from the individual storage vessels 3 of the gas sources 2 to the individual outlet connections 8 can be established. In this way, flow of gas to the storage vessels 3 from the outlet connections 8 and vice versa can be controlled.

More specifically, this means that the pressure in the gas sources can be controlled not only based on the relatively random gas equilibrium between a receiving vessel and a source vessel during a cascade refueling. The gas equilibrium is typically reached when the pressure different between source and receiver is below 50 bar. The lower pressure difference, the slower flow.

According to the present invention, the shift from one gas source 2 to another gas source 2 during a cascade refueling can be made at controlled gas pressure. Taking into consideration the pressure of all hydrogen gas sources 2 it can be determined to shift gas source even if equilibrium is not obtained between a gas source and a receiving vessel.

Alternatively, or in addition, the shift of gas source may also be controlled based on a desired flow rate. If e.g. the gas in the receiving vessel is getting close to the maximum temperature threshold, the flow could be continued by with a reduced flow rate to postpone or avoid reaching the maximum temperature threshold.

Further, it should be mentioned that it e.g. based on temperature development in gas in the receiving vessel, it can be determined to pause the refueling from one gas source without changing gas source when resuming the refueling.

Flow is typically regulated to ensure that an upper flow limit (sometimes specified in a refueling standard) is not crossed.

A flow of pressure starts when a valve opens. Typically, a valve is fully opened according to the valve characteristics.

When referring to a gaseous flow, a reference to transfer of gas from a gas source to e.g. receiving vessel over time. Gas flow below 0.001 kg per second is considered a pause or stop of flows. A normal flow is considered between 0.02 kg per second and 0.2 kg per second such as around 0.12 kg per second, hence a low flow can be below 0.02 kg per second and a high flow is e.g. above 0.2 kg per second up to e.g. 0.4 kg per second. Change of gas source may be considered when the gas flow is reduced to e.g. 0.01 kg per second. The mentioned limits are examples and may obviously change e.g. according to design of mobile refueling station, types of fuel cell vehicles that is to be refueled, etc.

As mentioned, the flow of gas in the conduit system towards a receiving vessel can be controlled e.g. based on temperature of gas in the receiving vessel and based on pressure in the storage vessels 3. Information of pressure in the storage vessels 3 may be obtained by sensor units 10. In the embodiment illustrated in FIG. 1, a sensor unit 10 is associated with gas source **2*b*, 2*n* such that it may record a physical state of the pressurized gaseous hydrogen contained in gas vessels 3 thereof. Depending on status of valves, this sensor unit may also measure physical state of pressurized gaseous hydrogen in other storage vessels 3**.

The physical state that the sensor units 10 record may for example be pressure and/or temperature. Note that embodiments of the invention are not restricted to two sensor units, and may for example comprise one, three, four, five, or more than five sensor units, for example distributed in the conduit system, associated with any of the gas sources/storage vessels, etc. A sensor unit may typically either measure a single or multiple properties, including a physical state, of a pressurized gaseous fluid for each vessel, section and/or bank of a mobile refueling station 1.

It should be mentioned that the measurements from a sensor unit may vary depending on flow in the conduit system 6. Accordingly, if e.g. pressure is measured as sections valves are open, allowing gaseous fluid to move from one section to another (pressure equalization), the measured pressure may settle after a settling period. This is because the flow affects pressure measurements and performing a measurement which is indicative of an equilibrium pressure may require waiting a settling time measured in seconds such as below 30 seconds after flow has ended. Similarly, when section valves are opened and flow begins, the temperature may increase with pressure. Hence, a temperature measurement may also require a settling time to pass.

Pressure measurements in general are made on gas vessels of the mobile refueling station partly for safety reasons such as for leakage detection and partly for optimized control of refueling of a fuel cell vehicle from the mobile hydrogen refueling station 1. Hence, when the mobile refueling station 1 knows pressure both at the storage and at the nozzle the pressure reduction in the mobile refueling station can be determined and controlling of refueling can be adapted accordingly.

In the embodiment of FIG. 1, the sensor units 10*a*-10*b* are communicatively connected to a monitoring and control unit 11, which receives representations of the physical states i.e. the measurements that the sensor units 10*a*-10*b* record, to generate trailer information data, which is stored on a data memory. This data memory may, for example, be physically connected to the monitoring unit and control unit and thus located on the mobile refueling station 1, or it may, for example, be a cloud-based data memory, with which the monitoring and control unit 11 communicates wirelessly. The exact specifications of the monitoring and control unit 11 may be chosen accordingly by a skilled person.

Trailer information data may for example be used to monitor the mobile refueling station 1 or be used as basis for controlling the mobile refueling station 1. A user may for example perform reloading on the basis of trailer information data comprising records of pressure of pressurized gaseous fluid, e.g. if a recorded pressure in the second gas source 2*b* is below a pressure threshold, or if a differential pressure between the two gas sources 2*b*-2*c* are below a pressure threshold. Such control may be performed automatically the monitoring and control unit. It may further be performed on basis of communication between the monitoring and control unit 11 with external controllers such as of a hydrogen refueling station, a compressor controller, a reload controller/fill station controller, etc. Reloading should be understood as internal reload i.e. between gas sources 2 or reload from an external gas sources into one or more of the gas sources 2 of the mobile refueling station 1.

Monitoring of the mobile refueling station may as mentioned be used for leakage detection. It may also be used in planning of routing of a mobile refueling station returning to a mobile refueling station fill station. Hence, if a remaining pressure of a mobile refueling station is communicated to a central computer and the same central computer knows that a particular refueling station or refueling site needs hydrogen. Then based on information of pressure in the mobile refueling station, the central computer may suggest replacement of the mobile refueling station of direct fuel cell vehicles to the site of the mobile refueling station. In addition, information of remaining pressure in gas sections of a mobile refueling station can be used to planning of production of hydrogen i.e. what is needed to load the mobile refueling station again. This is especially advantageous when the central computer (such as e.g. a cloud computer) is communicating with a fleet of trailers.

According to an embodiment, a user or the control unit 11 may also control, for example, section valves 7*a*-7*c* based on the information data. For example, if a total amount of pressurized gaseous fluid loaded on the mobile refueling station 1 is above a certain threshold, the section valves 7*a*-7*c* are configured to have a smaller gas bank of lower pressure, and a larger gas bank of higher pressure, e.g., referring to the embodiment illustrated in FIG. 1, the first section valve 7*a* is open and the second section valve 7*b* is closed, such that two or more gas sources 2 together forms one gas section. Then, if the total amount of pressurized gaseous fluid loaded on the mobile refueling station 1 is below a certain threshold, the section valves 7*a*-7*c* may be configured to establish a larger gas section of lower pressure, and a smaller gas section of higher pressure. E.g., referring to the embodiment illustrated in FIG. 1, the first section valve 7*a* is closed and the second and third section valves 7*b*, 7*c* are open, the gas sources 2*c*, 2*d*, 2*n* effectively contribute to one gas section and source 2*a*, 2*b* contributes to another gas section. As such, the section valves 7*a*-7*c* control whether the gas sections 4 of the mobile refueling station 1 have a 40/60 distribution, a 60/40 distribution or other partitioning among gas sources 2. The partitioning may be based on information data recorded using at least one sensor unit 10.

In this way, the gas sources 2 can be partitioned as required or desired according to the most efficient way of storage hydrogen gas e.g. with respect to future refueling of receiving vessel, reload of the mobile refueling station, pressure in the storage vessels 3, etc.

In principle there are no restrictions to the number of gas sections 4, and the gas sections 4. Increasing the number of gas sections to more than two may for example allow improved cascade fueling of a receiving vessel connected to the mobile refueling station. It may further allow more detailed schemes of reloading among the vessels 3 of the mobile refueling station.

Section valves 7*a*-7*c* may also be controlled based on whether the outlet connections 8*a*-8*c* are fluidly connected to a hydrogen refueling station comprising a compressor to perform reloading among gas sources 2.

It should be mentioned, that more than two gas sections may be advantageous especially with respect to direct cascade fueling of a receiving vessel from the mobile refueling station. Several gas sections with different pressures may be established either when the mobile refueling station is loaded, when controlling which gas sources to use when refueling a receiving vessel or when connected to a compressor. Hence, establishing having a so-called fueling storage (e.g. 700-1000 bar), a high-pressure storage (e.g. 350-700 bar) and medium/low-pressure storage (50-350 bar) in a mobile refueling station may be possible.

It should be noted that the section valves 7 are optional for a trailer design implementing the refueling method of the present invention. Being able to change volume of the gas source is a feature of the trailer design that may allow additional flexibility in selecting/matching gas source and thereby controlling gas pressure/amount of gas at the trailer according to a desired pressure profile.

FIG. 2 illustrates a mobile refuelings station such as the one illustrated in FIG. 1 to which two receiving vessels 12*a*, 12*b* are connected via fill hoses 13*a*, 13*b*. The flow of gaseous hydrogen from the storage vessels 3 to the receiving vessels 12 can be controlled by the controller 11 controlling valves of the mobile refueling station as described with respect to FIG. 1.

The receiving vessels 12 is preferably part of a fuel cell vehicle (not illustrated) but could also be part of another mobile refuelings station or a stationary hydrogen refuelings station. In case, the receiving vessels 12 is part of a fuel cell, the pressure and/or temperature of the receiving vessel 12 may be monitored by a receiving side sensor 16 communicating with a receiving side controller 14. The receiving side controller 14 may communicate with the controller 11 e.g.

wired or wireless communication protocol such as via a wireless antenna 15 or cable (not illustrated)

After having connected one end of the first fill hose 13*a* to the outlet connection 8*a* of the mobile refueling station 1 and the other end of the first fill hose 13*a* to the first receiving vessel 12*a*. The initial pressure of the first receiving vessels is established. How the connection of the fill hose 13 in one or both ends is made is not essential to the invention and will therefore not be described further.

The start pressure $P_{start-a}$ of the first receiving vessel 12*a* may be established in different ways. The receiving side controller 14*a* may have this information and communicate it to the controller 11. Alternatively, a controlled pressure pulse may be sent to the receiving vessel 12*a*. Again, how the start pressure $P_{start-a}$ is established is not important, it is just needed for an optimal use or implementation of the present invention.

The start pressure $P_{start-a}$ of the first receiving vessel is used by the controller 11 to establish which of the gas sources 2 that should be used first to refuel the receiving vessel 12*a*. Hence, as example the start pressure $P_{start-a}$ of the first receiving vessel could be 120 bar and the pressure of the gas sources 2 are as described in table 1.

TABLE 1

| Gas source | 2a | 2b | 2c | 2d | 2n |
|---|---|---|---|---|---|
| Pressure [bar] | 250 | 300 | 400 | 500 | 500 |

In this example, the controller 11 may match the first receiving 12*a* vessel with gas source 2*a*. Thus, refueling of the first receiving vessel 12*a* from the gas source 2*a* may continue to a pressure difference of e.g. 50-20 bar is established between the source 2*a* and the vessel 12*a*. The pressure in the receiving vessel 12*a* may then e.g. be 170 bar and in the gas source 2*a* the pressure may e.g. be 200 bar. The refueling may then continue from either of gas source 2*b*-2*n*.

However, because of the missing means for cooling the gas entering the receiving vessel 12*a*, the temperature will increase as function of the established pressure increase in receiving vessel 12*a*. Therefore, to avoid a gas temperature in the receiving vessel 12*a* above a threshold temperature of e.g. 85° C. [deg. Celsius], the flow of gas have to be paused. Which inevitable will prolong the time required for refueling the first receiving vessel 12*a*.

As illustrated on FIG. 2*a* (by dotted lines), a second receiving vessel 12*b* is connected to outlet connection 8*b*. The connection and start pressure $P_{start-b}$ of the second receiving vessel 12*b* may be made similar to what is described above in relation to connection of the first receiving vessel.

As example, the start pressure $P_{start-b}$ is determined to be 50 bar. A match between this start pressure and a gas source 2 is then made by the controller 11. Depending on when during the refueling of the first receiving vessel 12*a*, the second receiving vessel 12*b* is connected and the refueling of the second receiving vessel 12*b* can start, there are several options for the controller in matching the second receiving vessel 12*b* with one of the gas source 2.

If the first and second receiving vessels 12*a*, 12*b* are connected/the refueling is started simultaneously, the pressures in the gas sources 2 are as found in table 1 applies. Hence, the two receiving vessels can be refueled simultaneously from the first gas source 2*a*. To facilitate this, the controller 11 opens source valve 5*a*, gas flow direction valves a1 and b1 and outlet valves 9*a*, 9*b* while keeping the other valves closed. The flow of gas is indicated with a dotted line from gas source 2*a* to the receiving vessels 12*a*, 12*b*.

If the first receiving vessel 12*a* is being refueled from the first gas source 2*a* while the refueling of the second receiving vessel 12*b* is to be initiated, the second receiving vessel 12*b* can still be match with the first gas source 2*a* and thus refueled therefrom.

When refueling two receiving vessels from the same gas source, the flow to the individual receiving vessels may be controlled differently e.g. based on start pressure in the receiving vessels, start temperature. This may lead to a more efficient use of the available gas in gas sources. The flow rated to the two receiving vessels may be controlled to be substantially the same. The flow rate to one of the receiving vessels may be controlled to be a faster than to the other. This is because temperature increases faster the lower pressure in the receiving vessel hence, the receiving vessel with the lowest flow will be filled with a lower flow rate compared to a receiving vessel with a higher pressure.

If the first receiving vessel 12*a* is being refueled from the third gas source 2*c* while the refueling of the second receiving vessel 12*b* is to be initiated, the refueling of the first receiving vessel 12*a* can continue from storage 2*c* while the refueling of the second receiving vessel 12*b* then will start from source 2*a*. This flow is controlled by the controller 11 controlling the relevant valves. In this way bey controlling valves, several simultaneous refuelings can be managed by the controller.

FIG. 2*b* illustrates a simplified mobile refueling station 1 where valves and conduits are replaced by a single manifold 22. The mobile refueling station still facilitates simultaneous refueling of the two receiving vessels 12*a*, 12*b* according to the paused refueling method of the present invention.

Flow from one gas source 2 to the first receiving vessel 12*a* is established while flow from one gas source 2 to the second receiving vessel 12*b* is paused and vice versa. Simultaneous refueling in the sense of flow from two different gas source having different pressure to two different receiving vessels is not possible by the design illustrated in FIG. 2*b*. This is however possible with the design illustrated on FIG. 2*a* which allow simultaneous refueling in the sense that flow to two or more receiving vessels can occur from the same or different gas source in the same refueling window.

It should be mentioned that some of the valves and conduits illustrated on FIG. 2*a* may be applied to the embodiment illustrated on FIG. 2*b* to allow flow from two different gas sources having different pressure to different receiving vessels.

The fueling scenarios illustrated on FIGS. 2*a* and 2*b* can as indicated above continue as long as the gas temperature in the receiving vessels 12*a*, 12*b* is below a maximum temperature threshold selected in the range between 60-90° C., such as between 75° C. and 85° C. In case the gas temperature in one of the receiving vessels is close to reach, reaches or increases above the maximum temperature threshold, the gas flow has to be paused to stop the pressure increase and thereby the temperature increase.

The flow from a gas source is controlled by the gas source valve 5 and to the receiving vessel by the outlet valve 9. It should be mentioned, that independent of implementation of the conduit system 6 (as a plurality of conduits and valves as in FIG. 2*a* or as a manifold in FIG. 2*b*) redundancy of gas source valves 5 and outlet valves 9 are preferred at least for safety reasons. Redundancy should be understood as two or more valves connected in series.

Independently if the two receiving vessels has the same gas source 2, the pauses in the refueling can be controlled. Further, the flow rate between pauses can be controlled to increase pressure in the receiving vessels faster or slower and thereby generate a faster or slower temperature increase. It should be noted that this spaced/passed refueling approach may also be applied if the two receiving vessels 12*a*, 12*b* are refueled from the same gas source 2 are started simultaneously or spaced in time.

The paused refueling approached of the present invention is particularly advantageous when the flow rated between pauses in the refueling is increased with a faster temperature increase as result. This leads to a shorter time with higher flow rated to the receiving vessel and an increased number of pauses during the refueling to avoid reaching the maximum temperature threshold which is typically undesired in the art.

A pause i.e. no flow or flow below e.g. 0.002 kg per second would typically be below 5 minutes such as between 2 and 4 minutes depending on e.g. ambient temperature.

According to the present invention however, this paused refueling approach is desired because of the possibility to connect two, three and up to 50 or 60 fuel cell vehicles simultaneously and thereby perform synchronous refueling thereof and because of the two, three and up to 10 or 15 gas sections of the mobile refueling station.

A shift between two gas sources 2 are also referred to as a bank shift. The flow of gas to a receiving vessel would typically be terminated during the bank shift, however in embodiments e.g. including the hose buffer storage, the gas flow may be maintained.

From a controller perspective, the many relatively short and intense refuelings between the pauses is regarded as refueling of a plurality of small volumes (small receiving vessels). Thereby, the controller can match the gas source with the receiving vessel according to a relative small pressure difference between the gas source and receiving vessel. With this said e.g. the first refueling where all gas sources are e.g. 500 bar, the pressure difference is not selectable. However, the decrease of pressure in the gas sources during a refueling may be controlled according to a pressure profile.

Selecting the smallest pressure difference should be understood as the smallest difference allowing the desired flow rate. This is advantageous in that the controller can match gas source and receiving vessel 5-10 times during a refueling and thereby use the pressurized gas available in the gas sources most optimal i.e. empty the gas sours as much as possible The controller 11 may facilitate estimation/calculation of which gas source to connect to the receiving vessel based on information of pressure in the receiving vessel and in all of the gas sources 2. In this way the controller 11 is able to select a gas source that has a pressure above the receiving vessel. Further the selection of gas source may also be made to match a desired pressure profile of pressure in all of the gas sources.

A pressure profile should be understood as a number of desired pressure levels distributed between the gas sources/gas sections of the mobile refueling station. A pressure profile may be established based on knowledge of refueling frequency/pattern of a given site. Such refueling pattern would include information of typical start pressure, refueling time, information of various relevant temperatures, etc.

In an embodiment of the invention where the sources are holding pressures of 250, 300, 450, and 500 bar where the start pressure of the receiving vehicle is 190 bar, such a pressure profile might be depending on the preferences between utilization degree of the gas available in the gas sources and the speed of refueling. In this case the 250 bar storage would be used as the initial pressure source if hydrogen utilization was the main objective, whereas the 300 bar storage might be chosen if refueling speed is more important.

Hence, sometimes, to adjust pressure in gas sources 2 to a desired pressure profile, what otherwise may seem as a rather unlogic matches, may makes sense to align actual pressure in gas sources as close as possible to the desired pressure profile. An example of an unlogic match would be a gas source having a pressure just above a receiving vessel. Just above could here be between 50 and 75 bar. Further, if this gas source is close to empty and if time for the refueling is not relevant, the match makes further sense in that then this gas source may be emptied further in that time is available to allow a low flow rate.

Selecting the gas source 2 having the smallest remaining amount of gas should be understood as selecting the gas source storing the amount or just above the amount of gas estimated to be needed for a refueling between two subsequent pauses. This is advantageous in that in this way the gas sources are emptied as much as possible.

The controller 11 may facilitate estimation (especially used in relation to non-communication refuelings)/calculation of the amount of gas that can be filled into a receiving vessel according to a predetermined pressure ramp rate ensuring that the temperature of the gas inside the receiving vessel does not exceed the maximum temperature threshold. The controller 11 may find/estimated one or more unknown parameters via knowledge of value of other parameters. Hence if e.g. start temperature of gas in gas source and in receiving vessel is known together with ambient temperature and a representation of thermic distribution to surroundings from the receiving vessel (volume of the receiving vessel may be split in two or more receiving vessels increasing the physic size of the receiving vessel and thereby increase thermic distribution from gas/receiving vessel to its surroundings), then gas temperature derived from a given pressure ramp rate can be found and thereby the amount of gas that can be filled into the receiving vessel can be calculated/estimated/found in a table, etc.

Selecting the match of gas source and receiving vessel alone on or on a combination of small pressure different and small remaining volume is advantageous in that the gas sources are empties as much as possible and thereby the efficiency of the mobile refueling station is increased e.g. in terms of power used to reload the mobile refueling station, energy used on returning the mobile refueling station to its reload site with remaining hydrogen gas, etc.

FIGS. 3*a* and 3*b* illustrates a mobile refueling station 1 having a gas storage 2, 3, 4 fluidly connected to a conduit system 6 including valves for controlling flow of gas from the gas storage to the receiving vessels. It should be mentioned that the conduit system may also be at least party implemented as a manifold to reduce the number of individual pips in the conduit system.

The receiving vessels are illustrated as busses 17 i.e. the illustrated busses each comprising one or a system of two or more receiving vessels. It should be noted that the receiving vessel, even though illustrated as busses, may also be part of other types of fuel cell vehicles such as trucks, cars, trains, ships, arial vehicles, etc.

The embodiment of the invention illustrated on FIG. 3*a* is an example of a plurality of fuel cell 17 vehicles that are being fluidly connected to the mobile refueling station 1 via fill hoses 13.

The embodiment of the invention illustrated on FIG. 3*b* is an example of a plurality of fuel cell vehicles 17 that are being fluidly connected to the mobile refueling station 1 via a fueling pipe (also referred to as a fueling manifold) 18. The fueling pipe 18 may be implemented as a metal conduit with a plurality of hydrogen outlet connections via which the fuel cell vehicles 17 can be connected by fill hoses 13. Note that refueling of fuel cell vehicles directly via a fill hose 13 connected to the mobile refueling station 1 may also be made on the embodiment illustrated on FIG. 3*b* even though not illustrated.

Only one mobile refueling station 1 is illustrated connected to the fueling pipe 18, however more than one mobile refueling station may be connected to the fueling pipe 18. Further, the fueling pipe 18 may comprise non-illustrated valves for sectioning the fueling pipe 18 i.e. close for gas flow to parts e.g. in case of leakage associated with that part.

The refueling made according to the embodiment illustrated on FIG. 3*b* may be implemented based on the same principles as described above. It may however also be implemented as a long-term refueling session. A long-term refueling session may be understood as a session lasting for several hours such as 2-7 or 5-10 or even 12-14 hours. Preferably, all fuel cell vehicles are connected to the filing pipe 18 before the refueling session is started.

The controller may not need start pressure for the receiving vessels of the fuel cell vehicles in that it is simply allowing a flow of hydrogen from a gas storage having a low conservative pressure such as 50 bar. If flow is not detected, the controller selects another gas source having a higher pressure such as 100 bar and so on until flow is established. Depending on time available, the flow continues also even though the volume of gas refueled to the one or more fuel cell vehicles is low per time unit. This is to empty the gas source as much as possible.

If time is an issue, then when the flow rate decreases to a minim flow rate threshold such as e.g. between 5 gram per second and 40 gram per second, the controller performs a shift of gas source to a gas source having a higher pressure and thereby increasing the flow rate. Because of the relatively low flow rate, which in this type of long-term refueling is typically not is above 40 gram per second. In case of high ambient temperature, the flow may not be above 5-10 gram per second. The thermic distribution of the receiving vessels is sufficient to ensure that the maximum gas threshold temperature is not exceeded in the receiving vessels.

To allow this way of refueling of a plurality of fuel cell vehicles 17 having individual start pressure, the fuel cell vehicles 17 can be connected to the filing pipe 18 via check valves. Hence, when the pressure in the filing pipe 18 exceeds the pressure in the receiving vessel of the fuel cell vehicle 17, the refueling of that fuel cell vehicle 17 is started. Accordingly, this method of refueling a plurality of fuel cell vehicles may start with refueling of one fuel cell vehicle 17 and as pressure increases in the receiving vessel of that fuel cell vehicle, others are automatically, via the check valves, also started to be refueled. Other ways of controlling simultaneous/synchronous refueling of a plurality of fuel cell vehicles may also be implemented within the scope of the invention.

The refueling site design illustrated in FIG. 3*b* may also be equipped with a buffe tank 19. Such stationary or mobile buffer tank 19 may add flexibility to the refueling site in that refueling may be made even though no mobile refueling station is connected to the filing pipe 18.

The number of connectable fuel cell vehicles 17 is in principle only determined by available site footprint. However, a typical mobile refueling station when completely reloaded may comprise hydrogen gas enough to perform refuelings of up to 50 busses. The number may vary e.g. depending on the amount of gas in the receiving vessels of the busses.

It should be noted that typically one mobile refueling station would be sufficient to refuel a fleet of 5 to 10 busses, but more could be refueling. Further, more than one mobile refueling could be connected to the filing pipe 18 which would increase flexibility in refueling (illustrated on FIG. 3*b* in dashed lines). Having more gas storage pressure for the controller to select between when deciding the gas source of a refueling will increase efficiency of the use of the mobile refueling station i.e. the cost of each gram of hydrogen gas transported to the refueling site is reduced.

It should be mentioned that the longer time available for a refueling, the better exploitation/increased efficiency of gas available of the mobile refueling station is possible. Increased efficiency may be measured e.g. in state of charge of the receiving vessel at a given pressure available at the gas sources. Hence, increasing or maintaining a given state of charge while the pressure reduces in the gas sources is one way of measure efficiency.

The final state of charge/the desired state of charge is 100% (e.g. defined by target pressure at 15° C.) this may not always be possible, hence a state of charge at or above 90% would sometimes also be sufficient.

According to an embodiment, a refueling may be either of a state of charge based or a time based refueling. The state of charge of a time based refueling may obtain higher state of charge even with low pressure at the mobile refueling station (the state of charge however may not be higher than possible by gas pressure at the mobile refueling station). If time is an issue, then state of charge may be compromised to a faster refueling time i.e. the faster the refueling should finished, the lower state of charge is expected.

Note that during any of the refueling methods, a new fuel cell vehicle may be connected and refueled simultaneously with another fuel cell vehicle that is refueled to a pressure which is more than 50-200 bar or more above the initial pressure of the receiving vessel of the new fuel cell vehicle.

The mobile refueling station has above been described as a mobile refueling station from which tanks of vehicles connected thereto can be refueled. It should be noted, that one (or more) such mobile refueling station(s) may act as an external supply to a stationary or another mobile refueling station or to a hydrogen dispenser. In this way such stations/dispensers may benefit from a the refueling principles specified in this document.

FIG. 4*a* illustrates a graph on which the relationship between pressure in gas sources 2*a*, 2*b*, 2*c*, 2*d*, 2*e* (dashed lines) and in receiving vessels R1, R2 and R3 over a time period T0-T6 is illustrated. This is just one example of how such relationship between three simultaneous refuelings may look (from T6, between T0 and T6 there are only two simultaneous refuelings).

Along the Y-axis, pressure of the gas sources $P_{S2a}$-$P_{S2e}$ and receiving vessels $P_{R1}$-$P_{R2}$ are illustrated and along the X-axis, the times T0-T6 are illustrated. Note, that according to the above description, the mobile refueling station may comprise more than five gas sources 2 and more than four fuel cell vehicles fluidly simultaneously connected thereto.

The start pressure $P_{R1}$ of receiving vessel R1 is approximately 125 bar and the state pressure $P_{R2}$ of receiving vessel R2 is approximately 200 bar. The start pressure $P_{2a}$ of gas source 2*a* is just below 50 bar, the start pressure $P_{2b}$ of gas source 2*b* is just below 200 bar, the start pressure $P_{2c}$ of gas source 2*c* is 400 bar and the start pressure $P_{2d}$, $P_{2e}$ of gas sources 2*d*, 2*e* is 500 bar. These pressures can be read at time T0.

Therefore, at time T0 receiving vessel R1 is match with gas source 2*b* and receiving vessel R2 is matched with gas source 2*c* and flow therebetween is established. That flow is established is illustrated by the pressure decreases in the gas sources 2*b*, 2*c* and the corresponding pressure increase in receiving vessel R1 and R2.

In this particular embodiment, the pressure threshold/differential pressure of 50 bar is define as pressure threshold of performing shift of gas source. Therefore, at time T1, wherein the differential pressure between receiving vessel R1 and gas source 2*b* is approximate 50 bar, the gas source for flow to receiving vessel R1 is changed to gas source 2*c*. Hence from time T1 both receiving vessel R1 and R2 are refueled from gas source 2*c*.

At time T2, the differential pressure between receiving vessel R2 and gas source 2*c* is approximate 50 bar, the gas source for flow to receiving vessel R2 is therefore changed to gas source 2*d*.

At time T3, the differential pressure between receiving vessel R1 and gas source 2*c* is approximate 50 bar, the gas source for flow to receiving vessel R1 is therefore changed to gas source 2*d*. From time T3 both receiving vessels are refueled from gas source 2*d*.

At time T4, the differential pressure between receiving vessel R2 and gas source 2*d* is approximate 50 bar, the gas source for flow to receiving vessel R2 is therefore changed to gas source 2*e*.

At time T5, the differential pressure between receiving vessel R1 and gas source 2*d* is approximate 50 bar, the gas source for flow to receiving vessel R1 is therefore changed to gas source 2*e*. Again, from time T5, both receiving vessels R1 and R2 are refueled from gas source 2*e*. After time T5 if nothing is done, the pressure in two receiving vessels R1 and R2 and gas source 2*e* will approach pressure equilibrium.

It should be noted that the graph for pressure in receiving vessel R2 at T4 reached the temperature compensated target pressure. Regarding the graph for receiving vessel R1, the temperature compensated target pressure is higher than for receiving vessel R2 because the temperature in the first receiving vessel R1 is higher than in second receiving vessel R2. The density when terminating the refueling of receiving vessels R1 and R2 may therefore still be the same At time T6, a third receiving vessel R3 is connected and refueling hereof is started. The differential pressure between receiving vessel R3 and gas source 2*a* is below 50 bar so receiving vessel R3 is matched with gas source 2*b*. From time T6 the third receiving vessel R3 is refueled from gas source 2*b* until the pressure threshold of 50 bar is reached. Then bank shift would be performed as described above.

It should be noted, that e.g. based on past refueling history of the site/fleet, the pressure threshold value may be changed to maintain a certain amount of pressure in the gas sources. In other words, a gas pressure in the gas sources according to a pressure profile is established or maintained based on past refueling history by changing the pressure threshold (decisive for bank shift) of individual of the simultaneous refuelings.

The relationship between pressure in receiving vessels R1-R4 and gas sources 2*a*-2*e* is illustrated with no pauses during the refueling. Hence, the combination of pressure increase in the receiving vessels, initial conditions, ambient temperature and the like result in a temperature development in the receiving vessel that is below the temperature threshold.

FIG. 4*b* illustrates a ramp rate for refueling of receiving vessels R1-R4 of three fuel cell vehicles according to the same principles as describe in relation to the refueling illustrated on FIG. 4*a*. The refuelings illustrated in FIG. 4*b* however, requires a pause in the gas flow to keep the temperature in the receiving vessel below the temperature threshold. Hence, in FIG. 4*b* a flow can be terminated from one source gas both due to the pressure threshold (as in described above in relation to FIG. 4*a*) but also due to the temperature threshold.

Looking at the pressure curve for receiving vessel R1. At 0 seconds it is noted that flow is provided. As there is no flow to other receiving vessels, the flow may be established from gas source 2*b*. After approximate 20 s the flow to receiving vessel R1 is paused for approximated 25 s. From a look at the curves (of PS2b and PR1) the pause may be due to the pressure threshold of 50 bar is reached. The reason for the pause may be to reduce temperature in receiving vessel R1 prior to starting the refueling again. When the refueling is started again, flow is established from gas source 2*c* until the next pause. Again from a look at the graphs (of PS2c and PR1) the pause may be initiated because the pressure threshold is reached. Again, the reason for not starting instantly with flow e.g. from gas source 2*d* is a required temperature reduction in receiving vessel R1 to obtain before starting. Receiving vessel R1 is filled to its maximum possible pressure at end of refueling just above 400 bar from gas source 2*d* and 2*e* with pauses as described above.

The maximum pressure is defined by the pressure in the gas source. Hence, if a sixth gas source was available having a pressure of e.g. 500 bar, then the maximum pressure at the end of refueling may be higher.

Looking at the pressure curve for receiving vessel R2 it is noted, that it starts by a pause and after approximate 10 s receiving vessel R2 is refueled from gas source 2*b*. As described above with respect the pressure curve PR1, receiving vessel R2 is filled similarly just with flow displaced in time compared to receiving vessel R1.

Looking at the pressure curve for receiving vessel R3 it is also noted, that it starts by a pause and after approximate 20 s receiving vessel R3 is refueled from gas source 2*c*. As described above with respect the pressure curve PR1, receiving vessel R3 is filled similarly just with flow displaced in time compared to receiving vessel R1 and R2.

Now looking at the graph for pressure development of receiving vessel R4 it is noted, that the refueling is first initiated after approximate 220 s from gas source 2*b*. This part of the fueling only last for approximately 20 s e.g. due to a temperature increase above the threshold temperature. The refueling of receiving vessel R4 is paused and started again after approximate 320 s again from gas source 2*b*. After approximate 20 s refueling from source 2*b*, the differential pressure reaches the pressure threshold, and the flow continues from gas source 2*c*. Receiving vessel R4 is then filled from gas source 2*c* until the temperature of gas in receiving vessel R4 again reached the temperature threshold.

The reason for pausing refueling of receiving vessel R4 may e.g. be the thermodynamic of the physical vessel (e.g. geometry), the area of the vessel may simply be smaller and thereby the surface from which heat can dissipate to the surroundings is smaller and thereby the temperature increases faster. Another aspect may be temperature at the start of the refueling.

The steeper pressure ramp the faster pressure increase and thus, the more heat is generated in the receiving vessel.

The regulation of gas flow (dP/dt pressure increase per time unit) is made mainly by the controller matching the gas source and the receiving vessel. The larger the difference in pressure between gas source and receiving vessel the steeper pressure ramp rate (dP/dt) can be allowed. The controller may control the dP/dt to have the same average slope or faster increase just after initiating the flow than just before the termination of the flow.

The dP/dt of the pressure ramp rate and the length of each time period between two pauses is flexible and could in principle be any combination. With this said, the combinations should not lead to a pressure of gas in the receiving vessel exceeding the maximum temperature threshold. In the same way, refueling of new fuel cell vehicles can be started any time during ongoing refuelings. On FIG. 4*b* four simultaneous refueling is illustrated.

The paused refueling has the advantage that due to the steeper pressure ramp rate, the average refueling time of e.g. three fuel cell vehicle is faster than or equal to three successive refuelings made by known refueling methods on refueling stations having cooling system for cooling the gas prior to entering the receiving vessel. This is true even though that due to the pauses, the time of refueling of the individual fuel cell vehicle will be longer following the paused refueling method of the present invention.

Independent of refueling method, an ongoing refueling may be paused to allow a refueling of a new fuel cell vehicle to a desired pressure. The new fuel cell vehicle may have a priority higher than the fuel cell vehicle being refueled e.g. if the fuel cell vehicle is a bus that needs to leave the fuel site fast. The priority of the fuel cell vehicle may be known by the controller e.g. by a user providing the priority information to the controller, by communication between vehicle and controller, etc.

One way of implementing the refueling methods describe above include the following main steps which may in an embodiment be implemented as a control algorithm in the controller as described below. Other implementation including minor elements or twists to the below described may also fall within the scope of the present invention.

Presuming the connections that allows flow of hydrogen gas from one or more gas vessels 3 to receiving vessel(s) is established and all sensors and valves are communicatively connected to the controller.

The paused refueling method starts (for each of the connected fuel cell vehicles) by establishing start pressure of the associated receiving vessel (S1).

Then, a gas source is matched with the receiving vessel so that a flow of gas can be established from the gas source to the receiving vessel. Hence, the match requires a gas source having higher pressure than the receiving vessel (S2).

Then, flow of gas from the matched gas source to the receiving vessel is established by controlling status of the valves in the conduit system leading to an increase of gas pressure and thereby temperature in the receiving vessel (S3).

Then, temperature of the gas in the receiving vessel is monitored or derived from measurements or communication with a receiving side controller or sensor(s) associated with the receiving vessel. The gas temperature is compared to a maximum threshold temperature (S4). The flow of gas from the gas source to the receiving vessel is continued as long as the gas temperature in the receiving vessel is below the threshold temperature (No, return to S3).

Another situation (not illustrated in FIG. 5*a*) is if the pressure in the gas storage and the pressure in the receiving vessel get to close e.g. below 50 bar. In this case either a change of gas source (match at step S2) or a pause would be possible. The pause would be appropriate to avoid too many stops during one refueling window. Hence if e.g. the temperature is close to the threshold temperature and the pressure is close to the threshold pressure it may be advantageous to pause to reduce temperature before start refueling e.g. from the new gas source.

The refueling window may also sometimes be referred to as a refueling starting when the hose is connected to the mobile refueling station and stopped when the hose is disconnected from the mobile refueling station.

If the temperature of the gas in the receiving vessel is equal to or above the maximum threshold temperature (Yes in S4), a comparison of pressure in the receiving vessel with pressures in one or more of the gas sources is made (S5). If the gas pressure in the receiving vessel is within a range of 0-75 bar, such as between 10 and 50 bar, to the pressure of the gas source having the highest pressure, the refueling of the receiving vessel is considered terminated (Yes in S5). It should be noted that it may be possible to continue the gas flow to obtain pressure equilibrium between pressure in the receiving vessel and the gas source with highest pressure.

If the answer is No in step (S5), the refueling will be paused to allow a gas temperature decrease in the receiving vessel and after the pause, return to step S2. The length of the pause is determined e.g. by a decrease of gas temperature in the receiving vessel below 15° C. such as between 5 and 15° C. (S5).

Note that the flow of gas may be stopped in any steps independent of temperature e.g. for safety reasons, if desired state of charge is reached in the receiving vessel, if gas is leaking, etc.

As described above, the mobile refueling station may be connected to a filing pipe 18 and thereby refuel 10, 20, 30 or more such as 50 fuel cell vehicles simultaneously. One way of implementing this type of refueling is to start by allowing gas to flow from a gas source, having a relative low pressure, towards the receiving vessels and then stepwise increase pressure in source of the gas. Low pressure should here be understood as the lowest gas pressure in the plurality of gas source such as e.g. below 150 bar, such as below 100 bar.

Step one in this type of refueling multi vehicle refueling method is therefore, when a plurality of fuel cell vehicles is connected to the filing pipe, to allow flow of gas from a gas source towards the filing pipe. If no flow is determined, this indicates that the pressure in receiving vessel of all fuel cell vehicles is above the pressure in the gas source. In this case gas flow is instead allowed from a gas source having a higher pressure until flow is determined (S1). In this way fuel cell vehicles with a pressure in the receiving vessel below the pressure in the gas source is refueled from the gas source.

After having determined a gas flow and subsequently observed, that the gas flow is decreasing, the flow of gas from the current gas source is terminated and flow of gas is allowed from a gas source having a higher pressure (S2). This way of increasing source of the gas flow is continue until the gas source with the highest pressure is source of the gas flow (S3-Sn). In this way stepwise more and more of the fuel cell vehicles connected to the filing pipe is being refueled as the pressure in the gas source increases the pressure in their receiving vessels. Ultimately, towards the end of the refueling, all of the fuel cell vehicles are being refueled simultaneously/synchronous.

It should be noted that the refueling method may stop before the gas source with the highest pressure is used as source if desired.

Independent of refueling method, a refueling strategy may be determined prior to initiating the refueling. The refueling strategy may a temperature profile of the refueling to be made which may be established based on information of e.g. ambient temperature, start pressure in receiving vessel, start temperature of gas in receiving vessel. As an example, if the ambient temperature is low such as e.g. below 10° C. and the pressure in the receiving vessel is high such as e.g. above 100 bar the temperature development relative to pressure increase (and thereby gas flow) has one profile. This temperature profile is different if e.g. the ambient temperature is higher such as e.g. 20° C. or start pressure is lower such as e.g. 25 bar. Hence, depending on the time available i.e. if the refueling should be time or state of charge based refueling, the flow can be controlled to comply with the temperature profile.

Note that the refueling methods of the present invention may also be implemented on a stationary hydrogen refueling station.

From the above it is now clear that in an embodiment, the present invention relates to a mobile refueling station facilitating refueling of a plurality of fuel cell vehicles simultaneously. To facilitate this, without assistance from a compressor or a cooling system, the gas storage is controllable in sections to allow a plurality of different gas pressure in different gas vessels/gas sources/gas sections.

The mobile refueling station is controlled to perform paused refueling of receiving vessels of the fuel cell vehicles. The paused refueling method is based on the principles of allowing a fast pressure increase in the receiving vessel and then subsequent stop the flow to allow the temperature in the receiving vessel to decrease before a next refueling pulse is applied to the receiving vessel.

A complicated matching between pressure available in the gas sources and gas pressure levels in the receiving vessels connected to the gas sources is made by a controller of the mobile refueling station. The matching may be made according to a desired pressure profile of the gas storage, refueling time of one or more of the fuel cell vehicles, degree of utilisation of the gas available in the gas sources, etc. A poor utilisation could be relevant if a swap of mobile refueling station is planned before the available gas can be refueled to a receiving vessel.

LIST

1. Mobile hydrogen refueling station (referred to as mobile refueling station)
2. Hydrogen gas source (referred to as gas source)
3. Hydrogen storage vessel (referred to as storage vessel)
4. Gas section
5. Gas source valves
6. Conduit system
7. Gas section valves
8. Outlet connection
9. Outlet valve
10. Sensor unit
11. Monitoring and control unit (referred to as controller or control unit)
12. Receiving vessel
13. Fill hose
14. Receiving side controller
15. Communication device
16. Receiving side sensor
17. Fuel cell vehicle
18. Fueling pipe
19. Buffer tank
20. Hose buffer storage
21. Hose buffer valve
22. Manifold
a1-a4, b1-b4, c1-c4 gas flow direction valve

The invention claimed is:

1. A method of controlling a mobile hydrogen refueling station to perform simultaneous refueling of a first receiving vessel fluidly connected to a first hose and of a second receiving vessel fluidly connected to a second hose, said mobile refueling station comprises:

at least three hydrogen gas sources each of which are fluidly connectable to said first and to said second hose via a hydrogen conduit system, a controller controlling a plurality of conduit valves of said hydrogen conduit system and thereby controlling the flow of hydrogen gas from each of said at least three hydrogen gas sources to said first and second receiving vessels respectively, wherein said controller, during control of refueling of said first receiving vessel from a first refueling source of said at least three hydrogen gas sources, initiates the following steps:

establishing an initial pressure of hydrogen gas in said second receiving vessel connected to said second hose, selecting a second refueling source among said at least three hydrogen gas sources having a hydrogen gas pressure above said initial pressure, and thereby a first pressure difference between pressure in said second refueling source and said second receiving vessel, wherein said second refueling source is selected if said first pressure difference is below a second pressure difference existing between one of said at least three hydrogen gas source and said second receiving vessel, and opening at least one of said conduit valves thereby allowing hydrogen gas to flow from said second refueling source to said second receiving vessel wherein refueling of said first receiving vessel is controlled to be conducted in a plurality of successive steps of start and stop of the flow of hydrogen gas to said first receiving vessel, and wherein the simultaneous refueling of said first and second receiving vessels include a time period with flow to only one of said first and second receiving vessels and a subsequent time period with flow to both of said first and second receiving vessels.

2. A method according to claim 1, wherein a refueling of a receiving vessel includes the following steps:

connecting a receiving vessel to a hose, establishing an initial pressure of hydrogen gas in said receiving vessel, selecting a hydrogen refueling source among said at least three hydrogen gas sources having a hydrogen gas pressure above said initial pressure, opening at least one conduit valve to allow flow of hydrogen gas from said selected hydrogen refueling source to said receiving vessel, and closing said at least one conduit valve.

3. A method according to claim 1, wherein at least a first and a second hydrogen gas sources are fluidly connected via a first gas section valve.

4. A method according to claim 1, wherein said controller allows flow from said one hydrogen gas storage to both of said first and second receiving vessels, if the difference in pressure between pressure of said first receiving vessels and pressure of said second receiving vessel is below a threshold pressure.

5. A method according to claim 4, wherein said threshold pressure is dynamic and changes with pressure of a pressure ramp rate according to which refueling one of said first receiving vessel and said second receiving vessel are controlled.

6. A method according to claim 1, wherein said plurality of successive steps of start and stop includes between 5 stops and 10 stops.

7. A method according to claim 1, wherein said stops of said refueling of said first receiving vessel are longer than stops of said refueling of said second receiving vessel or vice versa.

8. A method according to claim 1, wherein a refueling of said first receiving vessel comprises between 5 and 10 bank shifts where each bank shift is characterized in that the pressure difference between a new hydrogen gas source and said first receiving vessel is below a pressure difference between said first receiving vessel and another hydrogen gas source of said mobile hydrogen refueling station.

* * * * *